US011252952B2

(12) United States Patent
Walsh et al.

(10) Patent No.: US 11,252,952 B2
(45) Date of Patent: Feb. 22, 2022

(54) RODENT TRAP HAVING A PIVOTING PLATFORM

(71) Applicant: OMS Investments, Inc., Los Angeles, CA (US)

(72) Inventors: James R. Walsh, Wauwatosa, WI (US); Paul R. Zeamer, Madison, WI (US); Daniel C. Johnson, Madison, WI (US)

(73) Assignee: OMS Investments, Inc., Los Angeles, CA (US)

(*) Notice: Subject to any disclaimer, the term of this patent is extended or adjusted under 35 U.S.C. 154(b) by 397 days.

(21) Appl. No.: 16/476,713

(22) PCT Filed: Jan. 9, 2018

(86) PCT No.: PCT/US2018/013001
§ 371 (c)(1),
(2) Date: Jul. 9, 2019

(87) PCT Pub. No.: WO2018/132388
PCT Pub. Date: Jul. 19, 2018

(65) Prior Publication Data
US 2019/0327955 A1 Oct. 31, 2019

Related U.S. Application Data

(60) Provisional application No. 62/444,613, filed on Jan. 10, 2017.

(51) Int. Cl.
*A01M 23/26* (2006.01)
*A01M 23/18* (2006.01)
(Continued)

(52) U.S. Cl.
CPC .......... *A01M 23/265* (2013.01); *A01M 23/18* (2013.01); *A01M 23/30* (2013.01); *A01M 23/16* (2013.01)

(58) Field of Classification Search
CPC ...... A01M 23/30; A01M 23/24; A01M 23/26; A01M 23/265; A01M 23/16; A01M 23/18; A01M 23/08
(Continued)

(56) References Cited

U.S. PATENT DOCUMENTS

| 83,074 A | 10/1868 | McClure |
| 212,151 A * | 2/1879 | Neal ..................... A01M 23/18 |
| | | 43/67 |

(Continued)

FOREIGN PATENT DOCUMENTS

| CA | 2348142 A1 * 11/2001 ............ A01M 23/04 |
| EP | 0280504 A2    8/1988 |

(Continued)

OTHER PUBLICATIONS

International Search Report and Written Opinion of the International Searching Authority for Application No. PCT/US2018/013001 dated Mar. 12, 2018 (6 pages).

*Primary Examiner* — Darren W Ark
(74) *Attorney, Agent, or Firm* — Ulmer & Berne LLP

(57) ABSTRACT

A trap has a housing including an entrance. Internally, the trap has a trigger structure including a trigger plate and a latch mechanism, coupled with the housing; and a pivoting structure pivotally coupled with the housing and adapted to releasably engage with the latch mechanism of the trigger structure. When the trap is triggered by a rodent, the pivoting structure disengages from the latch mechanism and the pivoting structure pivots towards a rear wall of the housing and the trigger plate, and the trigger plate pivots toward the pivoting structure, moving the rodent against towards the rear wall of the housing and trapping the rodent between the pivoting structure and the rear wall. Once the trap is triggered, the rodent is contained and in most cases, killed, within the trap.

19 Claims, 36 Drawing Sheets

(51) Int. Cl.
*A01M 23/30* (2006.01)
*A01M 23/16* (2006.01)

(58) Field of Classification Search
USPC .... 43/81, 81.5, 82, 83, 83.5, 88, 90, 92, 93, 43/60, 61, 64, 65, 67
See application file for complete search history.

(56) References Cited

U.S. PATENT DOCUMENTS

| | | | |
|---|---|---|---|
| 441,677 A | 12/1890 | Lovell | |
| 730,434 A * | 6/1903 | Bowen | A01M 23/18 43/67 |
| 895,017 A * | 8/1908 | Hooker | A01M 23/24 43/86 |
| 982,486 A | 1/1911 | Edwards | |
| 1,281,876 A | 10/1918 | Taylor | |
| D57,320 S | 3/1921 | Dorsch | |
| 1,587,536 A | 6/1926 | Lobit | |
| 1,677,470 A | 7/1928 | Dorsch et al. | |
| 1,726,493 A * | 8/1929 | Kelley | A01M 23/04 43/67 |
| 1,862,038 A * | 6/1932 | Session | A01M 23/18 43/67 |
| 2,257,246 A * | 9/1941 | Faucette | A01M 23/24 43/81 |
| 2,492,957 A * | 1/1950 | Blair | A01M 23/24 43/81 |
| 2,529,589 A * | 11/1950 | Biery | A01M 23/18 43/61 |
| 2,581,327 A * | 1/1952 | Knox | A01M 23/24 43/82 |
| 2,684,553 A * | 7/1954 | Schroeder | A01M 23/18 43/81 |
| 4,030,230 A | 6/1977 | Souza | |
| 4,144,667 A * | 3/1979 | Souza | A01M 23/18 43/61 |
| 4,245,423 A | 1/1981 | Souza et al. | |
| 4,253,264 A | 3/1981 | Souza | |
| 4,769,942 A | 9/1988 | Copenhaver | |
| 4,803,799 A | 2/1989 | Vajs et al. | |
| D300,163 S | 3/1989 | Landell et al. | |
| 4,829,700 A * | 5/1989 | Ha | A01M 23/18 43/61 |
| 4,852,294 A * | 8/1989 | Langli | A01M 23/24 43/81 |
| 4,856,225 A | 8/1989 | Radesky et al. | |
| 4,858,373 A | 8/1989 | Combs | |
| 4,926,581 A | 5/1990 | Grivas | |
| 5,040,327 A | 8/1991 | Stack et al. | |
| 5,044,113 A | 9/1991 | Stack et al. | |
| 5,148,624 A * | 9/1992 | Schmidt | A01M 23/30 43/81 |
| 5,172,512 A * | 12/1992 | Bodker | A01M 23/30 43/81 |
| 5,185,953 A * | 2/1993 | Gross | A01M 23/12 43/58 |
| 5,267,411 A * | 12/1993 | Phillips | A01M 23/30 43/81 |
| D346,199 S | 4/1994 | Spragins et al. | |
| 5,337,512 A | 8/1994 | Krenzler | |
| 5,384,981 A | 1/1995 | Cohen | |
| 5,398,442 A | 3/1995 | Musket | |
| 5,448,852 A | 9/1995 | Spragins et al. | |
| 5,471,781 A | 12/1995 | Vine | |
| 5,477,636 A | 12/1995 | Musket | |
| 5,481,824 A | 1/1996 | Fiore, Jr. | |
| 5,572,825 A | 11/1996 | Gehret | |
| 5,577,342 A | 11/1996 | Johnson et al. | |
| 5,588,249 A * | 12/1996 | Flinner | A01M 23/20 43/61 |
| D385,611 S | 10/1997 | Prince et al. | |
| D386,554 S | 11/1997 | Brewer | |
| 5,692,336 A | 12/1997 | Fiore, Jr. et al. | |
| 5,746,020 A | 5/1998 | Fiore, Jr. et al. | |
| 5,806,237 A | 9/1998 | Nelson et al. | |
| D409,711 S | 5/1999 | Johnson | |
| 5,950,353 A | 9/1999 | Johnson et al. | |
| 6,047,494 A | 4/2000 | Johnson et al. | |
| D441,828 S | 5/2001 | Leyerle et al. | |
| 6,266,917 B1 | 7/2001 | Hight | |
| 6,389,738 B1 | 5/2002 | Denny et al. | |
| D459,428 S | 6/2002 | Johnson et al. | |
| 6,397,517 B1 | 6/2002 | Leyerle et al. | |
| 6,415,544 B1 * | 7/2002 | Leyerle | A01M 23/24 43/82 |
| 6,481,151 B1 | 11/2002 | Johnson et al. | |
| 6,493,988 B1 | 12/2002 | Johnson | |
| 6,508,031 B1 | 1/2003 | Johnson et al. | |
| 6,574,912 B1 | 6/2003 | Johnson | |
| 6,594,948 B1 | 7/2003 | Novack | |
| 6,609,328 B2 | 8/2003 | Swift et al. | |
| 6,622,422 B2 * | 9/2003 | Gehret | A01M 23/04 43/61 |
| 6,631,582 B2 * | 10/2003 | Knuppel | A01M 23/04 43/114 |
| D485,597 S | 1/2004 | Turner | |
| 6,684,560 B2 * | 2/2004 | Lafforthun | A01M 23/16 43/61 |
| 6,691,452 B1 * | 2/2004 | Knuppel | A01M 23/04 43/64 |
| 6,694,669 B2 * | 2/2004 | Gehret | A01M 23/04 43/61 |
| 6,735,899 B1 | 5/2004 | Anderson et al. | |
| 6,775,947 B2 | 8/2004 | Anderson et al. | |
| 6,796,081 B2 | 9/2004 | Anderson et al. | |
| 6,807,768 B2 | 10/2004 | Johnson et al. | |
| 6,836,999 B2 | 1/2005 | Rich et al. | |
| 6,938,368 B2 | 9/2005 | Guidry | |
| 6,955,007 B2 | 10/2005 | Gehret et al. | |
| 6,990,766 B2 | 1/2006 | Gehret et al. | |
| D514,655 S | 2/2006 | Rodgers et al. | |
| D515,175 S | 2/2006 | Mayo et al. | |
| 7,010,882 B2 | 3/2006 | Rich et al. | |
| 7,026,942 B2 * | 4/2006 | Cristofori | A01M 23/04 340/384.2 |
| 7,069,688 B2 | 7/2006 | Hill | |
| 7,089,701 B2 | 8/2006 | Frisch | |
| D529,571 S | 10/2006 | Hoyes | |
| 7,171,777 B2 | 2/2007 | Welin-Berger | |
| 7,219,466 B2 | 5/2007 | Rich et al. | |
| 7,231,738 B2 | 6/2007 | Watson et al. | |
| D573,224 S | 7/2008 | Rodriguez | |
| D577,412 S | 9/2008 | Nathan et al. | |
| D589,583 S | 3/2009 | Phillips et al. | |
| D589,584 S | 3/2009 | Phillips et al. | |
| D619,673 S | 7/2010 | Cink et al. | |
| 7,814,702 B2 * | 10/2010 | Nathan | A01M 23/24 43/70 |
| 7,886,479 B2 * | 2/2011 | Bruno | A01M 23/08 43/67 |
| 7,921,593 B2 * | 4/2011 | Everett | A01M 23/34 43/85 |
| 8,104,222 B2 * | 1/2012 | Hovey | A01M 23/30 43/83.5 |
| D673,640 S | 1/2013 | Bailey et al. | |
| D678,977 S | 3/2013 | Huang | |
| 8,490,323 B2 * | 7/2013 | Nathan | A01M 23/30 43/81 |
| D722,127 S | 2/2015 | Huang | |
| D847,295 S | 4/2019 | Walsh et al. | |
| D868,201 S | 11/2019 | Walsh et al. | |
| 2004/0025410 A1 | 2/2004 | Shapland | |
| 2004/0088903 A1 | 5/2004 | Poche | |
| 2004/0244274 A1 | 12/2004 | Dellevigne et al. | |
| 2005/0279015 A1 | 12/2005 | Hall | |
| 2006/0032110 A1 | 2/2006 | Yang | |
| 2006/0042153 A1 | 3/2006 | Bowerman | |
| 2006/0053682 A1 | 3/2006 | Goldstein | |
| 2006/0117644 A1 | 6/2006 | Hoyes et al. | |
| 2006/0156615 A1 | 7/2006 | Hale | |
| 2006/0156617 A1 | 7/2006 | Hale | |

(56) References Cited

U.S. PATENT DOCUMENTS

| | | |
|---|---|---|
| 2006/0265941 A1 | 11/2006 | Newton |
| 2006/0272197 A1 | 12/2006 | Wiesener et al. |
| 2007/0017148 A1 | 1/2007 | Blau |
| 2007/0017149 A1 | 1/2007 | Rodgers et al. |
| 2008/0178517 A1* | 7/2008 | Han .................. A01M 23/18 43/81 |
| 2009/0151223 A1 | 6/2009 | Nathan et al. |
| 2011/0072708 A1 | 3/2011 | Nathan et al. |
| 2011/0072709 A1* | 3/2011 | Patterson ........... A01M 31/002 43/81 |

FOREIGN PATENT DOCUMENTS

| | | | |
|---|---|---|---|
| EP | 0745323 A1 | 12/1996 | |
| EP | 0806138 A1 | 11/1997 | |
| EP | 0553336 B1 | 1/1998 | |
| EP | 1149530 A2 | 10/2001 | |
| EP | 2230902 B1 * | 9/2018 | ........... A01M 23/24 |
| GB | 649807 A * | 1/1951 | ........... A01M 23/08 |
| GB | 2384966 A | 8/2003 | |
| GB | 2565808 A * | 2/2019 | ........... A01M 23/24 |
| JP | 06165630 A | 6/1994 | |
| JP | 07031354 A * | 2/1995 | |
| JP | 5431834 B2 * | 3/2014 | |
| WO | WO-8906491 A1 * | 7/1989 | ........... A01M 23/18 |
| WO | 9303612 A1 | 3/1993 | |
| WO | 02102147 A1 | 12/2002 | |
| WO | 03059057 A1 | 7/2003 | |
| WO | WO-2004030451 A2 * | 4/2004 | ........... A01M 23/30 |
| WO | 2005022992 A1 | 3/2005 | |

\* cited by examiner

RODENT TRAP HAVING A PIVOTING PLATFORM

CROSS REFERENCE TO RELATED APPLICATION

This application claims the benefit of U.S. Provisional Patent Application No. 62/444,613, filed on Jan. 10, 2017, the disclosure of which is hereby incorporated herein by reference in its entirety.

FIELD OF THE DISCLOSURE

The various embodiments relate to animal traps in general, and more particularly to rodent traps having a pivoting structure, which when triggered, traps and contains the rodent within the trap.

BACKGROUND INFORMATION

Conventional rodent traps, such as rodent traps, are not always self-contained. In other words, in conventional traps the trapping mechanism, and therefore the trapped rodent, are open to the environment so that they are visible to and accessible from the environment. Traps that are not self-contained may present a hazard to small children and pets. These and other problems exist with conventional traps.

Current kill and contain type traps rely upon a trigger plate that pivots towards a housing to trap the rodent against the housing when a pressure trigger plate is actuated by the rodent. Traps of this type are described in U.S. Pat. Nos. 7,814,702 and 8,490,323. Some kill and contain traps, such as those described in U.S. Pat. No. 7,921,593, employ a snare to kill the rodent when triggered by a rodent. Other kill and contain traps, such as those described in U.S. Pat. No. 7,886,479, employ first and second housing members that are slideably engaged to provide a collapsible trapping enclosure therebetween to trap and compress the rodent. Self-contained type traps contain (and sometimes kill) the rodent once the trap is triggered.

Improvements to the kill and contain trap may be made by improving the versatility of the rodents the trap may be used to catch and ease of use when setting the trap.

SUMMARY OF THE DISCLOSURE

In view of the foregoing, one or more embodiments include a trap that securely traps an animal, such as a rodent, e.g., a mouse, within an enclosure. The enclosure may have limited external accessibility and visibility, thus the trap and rodent may be disposed of without seeing and/or touching the rodent. The trap may have an external indicator to indicate to the end user when the trap is set and when a rodent has been trapped, without visually seeing the rodent to know the trap has been triggered.

In one embodiment, a trap includes a housing having an entrance, a rear wall, a first side wall, a second side wall, a roof, and a base extending between the rear wall, the first side wall, and the second side wall; the entrance being located opposite the rear wall; the roof extending between the rear wall, the first side wall, and the second side wall; a trigger structure pivotally coupled to first and second side walls at a first location adjacent the base; a pivoting structure pivotally coupled to first and second side walls at a second location and adapted to releasably engage with the trigger structure; and a trigger plate located at an upper portion of the trigger structure such that, when triggered by a rodent, the trigger plate causing a latch mechanism on the trigger structure to disengage the pivoting structure, causing the pivoting structure to pivot towards the wall thereby moving the rodent towards the rear wall and trapping the rodent between at least the pivoting structure and the rear wall of the housing.

In another embodiment, a trap includes a housing having an entrance, a rear wall, a first side wall, a second side wall, a roof, and a base extending between the rear wall, the first side wall, and the second side wall; the entrance being located opposite the rear wall; the roof extending between the rear wall, the first side wall, and the second side wall, the roof comprising a protrusion extending toward the base; a trigger structure pivotally coupled to first and second side walls at a first location adjacent the base; a pivoting structure pivotally coupled to first and second side walls at a second location and adapted to releasably engage with the trigger structure, the pivoting structure comprising a paddle and a vertical extension piece, wherein the vertical extension piece includes a distal end; and a trigger plate located at an upper portion of the trigger structure such that, when triggered, the trigger plate causing a latch mechanism on the trigger structure to disengage the pivoting structure, causing the pivoting structure to pivot to a triggered position such that the distal end of the vertical extension piece moves to a position adjacent the rear wall and the paddle moves to a position such that the paddle engages the protrusion of the roof, enclosing an interior portion of the trap.

These and aspects of the exemplary embodiments will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

The following description is intended to convey a thorough understanding of the embodiments by providing various embodiments and details involving a rodent trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the rodent traps of the various exemplary embodiments described herein have a housing having an entrance providing a passageway into the housing, a pivoting structure and latch mechanism coupled to the housing, which when a rodent, such as a mouse, triggers the trap, the pivoting structure moves towards the rear wall of the housing and traps the mouse against at least the rear wall of the housing. In the various embodiments described herein, the term rodent (or rat or mouse) is meant to be non-limiting as the traps described may be used to trap other animals.

The various exemplary embodiments generally described devices that "trap" a rodent, e.g., a rat or mouse. In the various embodiments, the rodent may simply be trapped inside the device so that it cannot escape from the device. However, the embodiments are not so limited. In various embodiments, the trapped rodent may be asphyxiated, immobilized, injured or killed. For example, in various exemplary embodiments, the trapped rodent may be immobilized inside the device by the device itself or by one or more blunt fingers inside the device. Where the trapped rodent is a mouse, immobilizing the mouse may cause the mouse to develop hypothermia which may eventually kill the mouse. In other embodiments, the device may injure the trapped rodent, such as by crushing it, or impaling it. In other embodiments, the trapped rodent may suffer a fatal injury, such as a broken neck.

Figure 1:
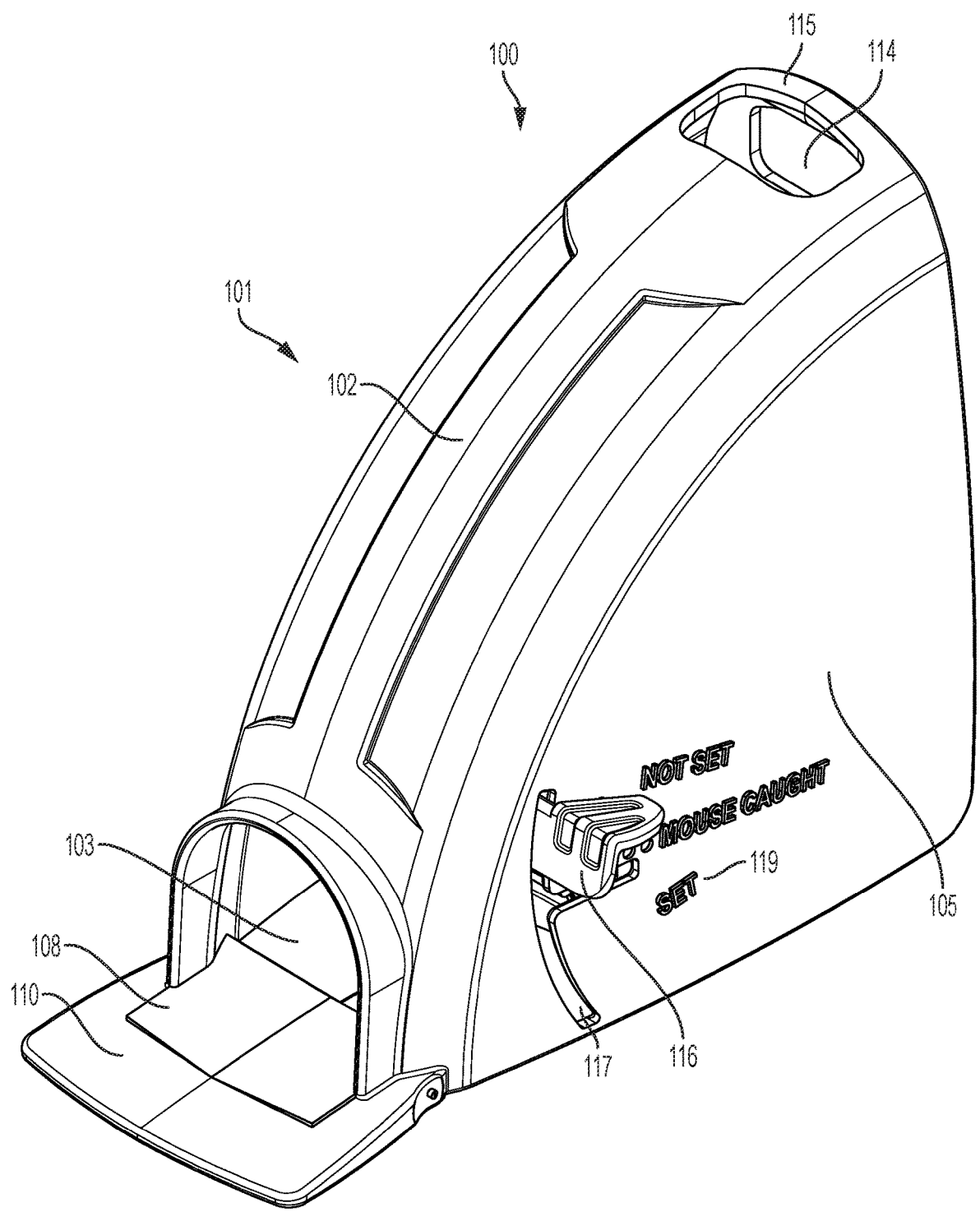
FIG. 1 depicts a perspective view of a trap in accordance with an exemplary embodiment.

Referring to FIG. 1, a perspective view of a trap in accordance with an exemplary embodiment is illustrated. It should be appreciated that trap 100 is a simplified view of an exemplary trap and may include additional elements that are not depicted as illustrated. As shown, the trap 100 may include a housing 101. The housing 101 may include a top wall or roof 102, a bottom or base 103, a first side wall 104 (illustrated in FIG. 2), a second side wall 105, and a back wall 106 (illustrated in FIG. 4). Although the housing 101 is depicted as comprising one piece, the housing 101 may comprise multiple pieces. The first side wall 104 and the second side wall 105 may each be their own pieces. The first and second side walls may have extending from them portions of top wall 102. The top wall 102 may be rounded and extend from the back wall 106 (illustrated in FIGS. 5, 6, and 7) towards the front of the housing 101. The housing 101 may include an entrance 107 (see FIG. 3), e.g., a passageway into the housing 101. For example, the top wall 102 may form an entrance 107 at a location which is close to or at the junction where the top wall 102 meets the base 103 of the housing 101. The first side wall 104 and second side wall 105 may be positioned on the longer, opposite sides of the base 103. The rear wall 106 and entrance 107 may be positioned on the narrower, opposite sides of the base 103. The housing 101 may include an entrance ramp 108 at or near the entrance 107. The entrance ramp 108 may be angled at a first end and terminate at a second end such that the higher end of the entrance ramp 108 is approximately flush with a base platform 110 which may be adjacent to the entrance ramp 108. The ramp may be a separate plate, attached to the base by a joint or hinge. The incline of the entrance ramp 108 may assist in attracting a rodent to enter the trap 100.

Figure 2:
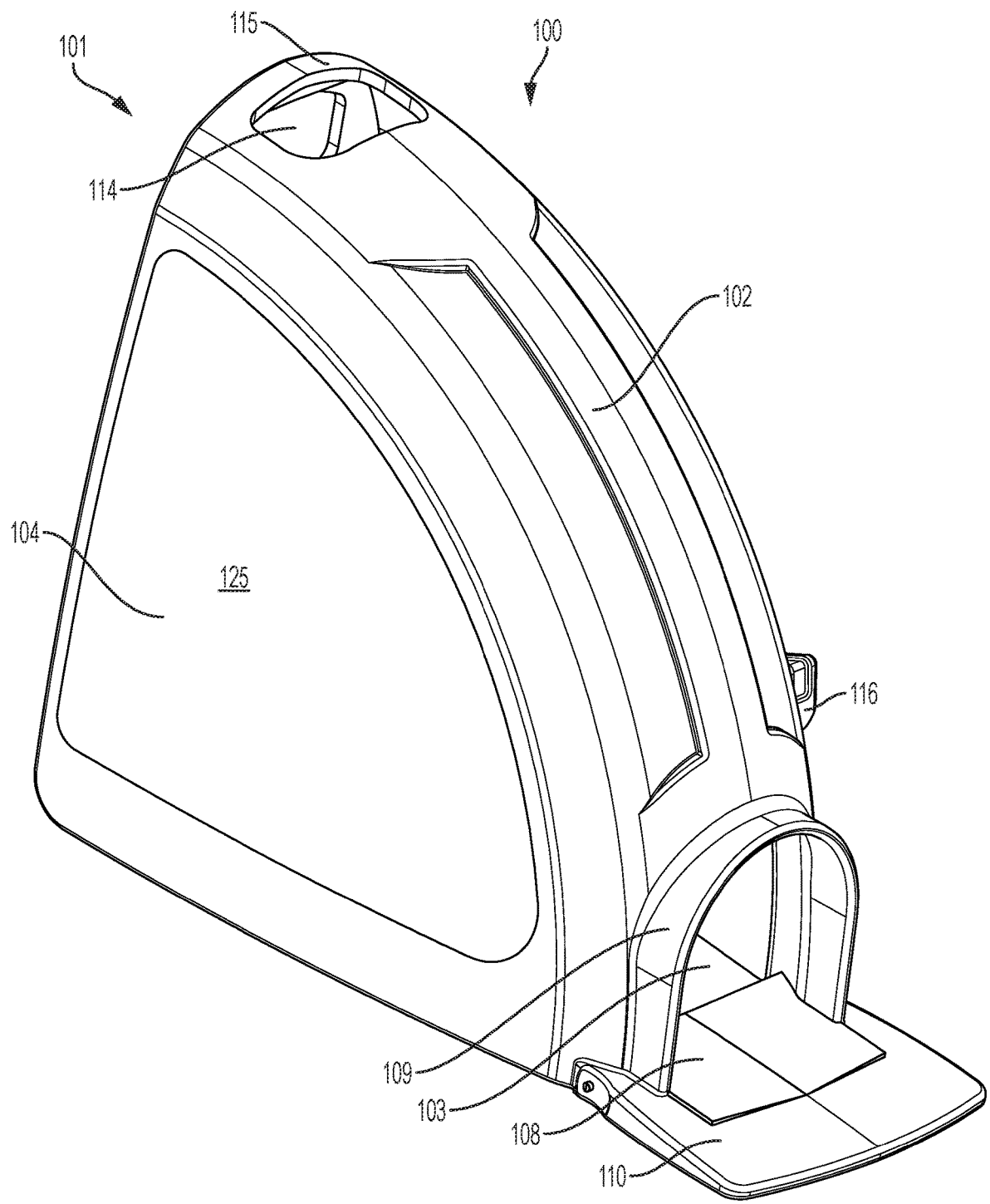
FIG. 2 depicts a second perspective view of a trap in accordance with an exemplary embodiment.
Figure 5:
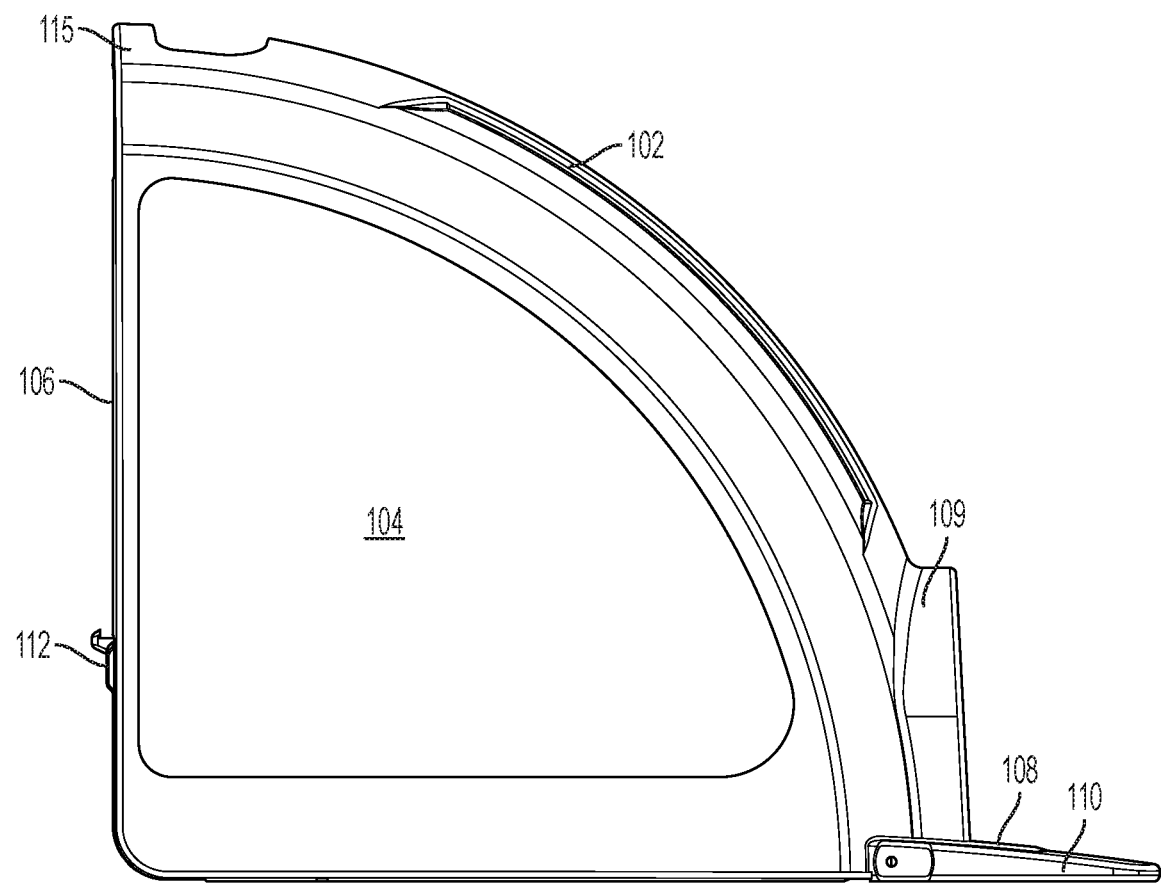
FIG. 5 depicts an external side view of a trap in accordance with an exemplary embodiment.

FIG. 2 is another perspective view of the outside of an exemplary embodiment of a rodent trap. One side wall of the trap may have a smooth surface. The first side wall 104 may be the side wall with a smooth surface. FIG. 5 is a side view of the outside of the rodent trap, illustrating the same surface as shown in the perspective view of FIG. 2.

Figure 3:
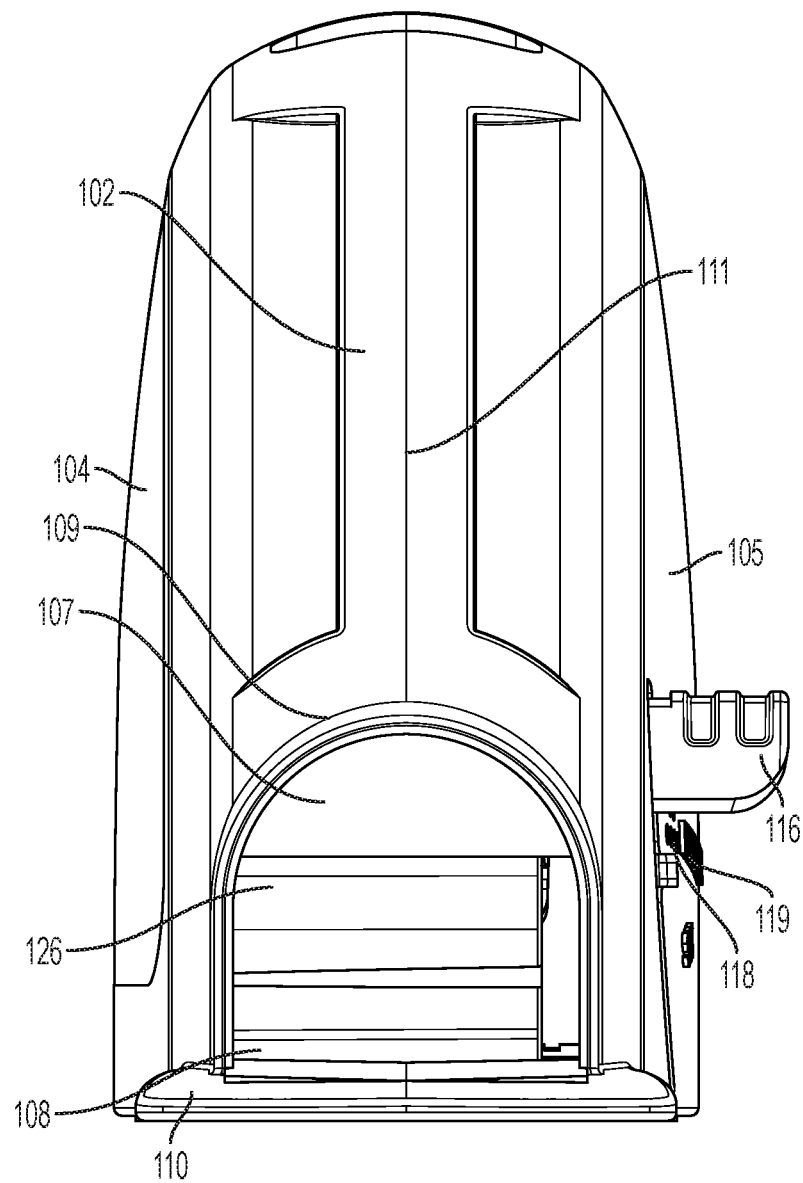
FIG. 3 depicts a front view of a trap in accordance with an exemplary embodiment.

FIG. 3 is an illustration of the front view of an exemplary embodiment of a trap. The front of the trap may include entrance 107, platform 110 and an arched covering 109 over the entrance. The platform may have an entrance ramp 108. The housing 101 of the trap may be comprised of two or more pieces fastened together. There may be a seam 111 on the top curved surface of the trap where two of the two or more pieces are joined together. The two or more pieces may be joined by prongs and openings for the prongs, located on the interior surface of the pieces of the housing. The two or more pieces may be joined by glue or other adhesive. In the alternative, the housing may be made of a solid piece of plastic, and therefore not have a seam.

Figure 4:
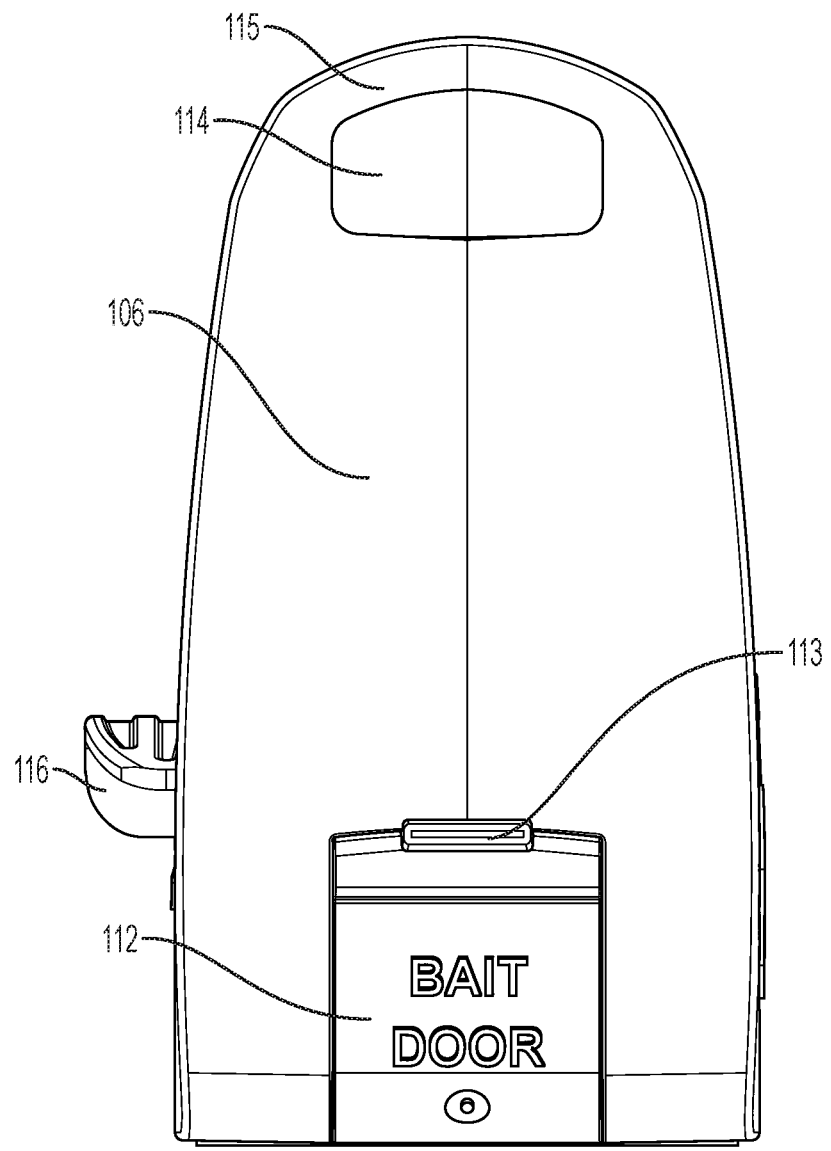
FIG. 4 depicts a rear view of a trap in accordance with an exemplary embodiment.

FIG. 4 illustrates a back view of an exemplary embodiment of a trap. The rear wall 106 of trap 100 has a bait door 112. The bait door may be located near the bottom of the back surface, such that the bottom of the bait door is flush with the bottom surface of the trap. The bait door may have a lever 113 or other handle on it so that the user can open the bait door.

FIG. 4 also illustrates an opening 114 located near the top back corner of the trap. This opening extends from the top surface through to the back surface, but does not provide access to the inside of the trap. There is a bridge piece 115 at the top-most and back-most position of the trap that covers the opening 114. The bridge piece is optional. The bridge piece may function as a handle to hold on to the device to dispose of it once a rodent has been trapped within the device.

Figure 6A:
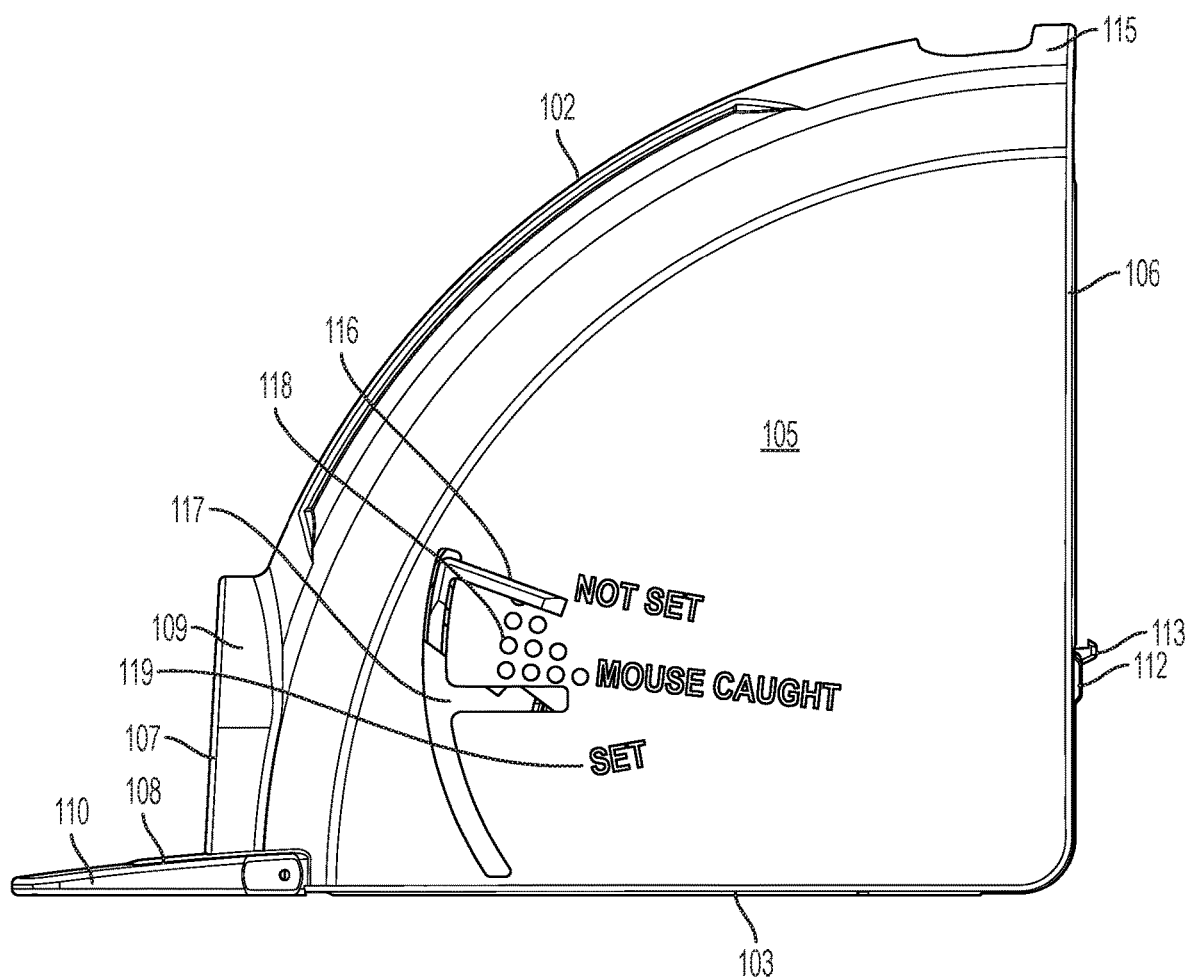
FIG. 6A depicts a second external side view of a trap in accordance with an exemplary embodiment.
Figure 6B:
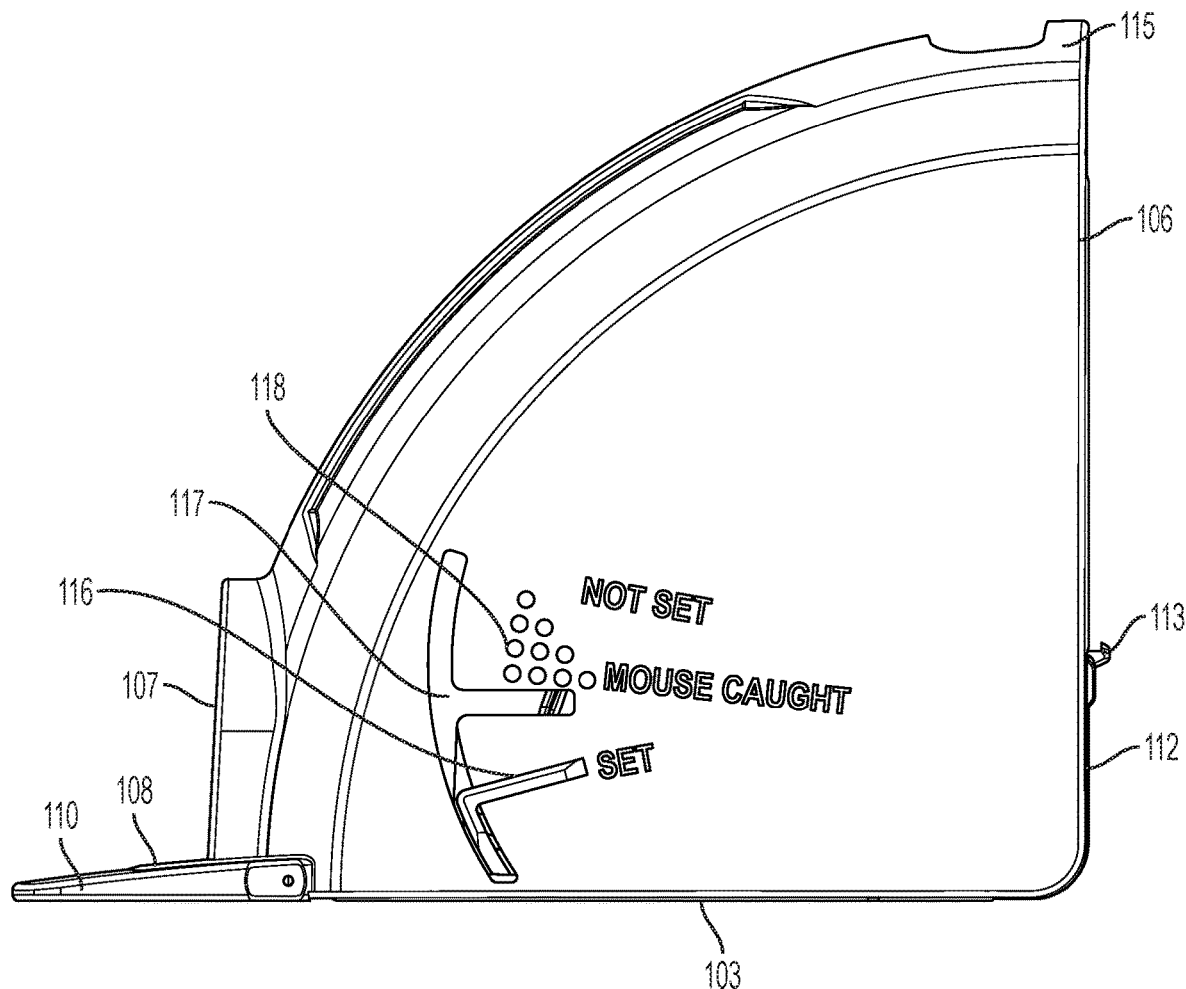
FIG. 6B depicts a second external side view of a trap in accordance with an exemplary embodiment in the set position.

FIG. 6A is a side view of an exemplary embodiment of the trap. On this side of the trap, the set arm 116 is visible. The set arm is attached to the pivoting structure 300 inside the trap 100 and extends outward through a slot 117. The slot 117 is a cut out on the side of the trap, and may be curved. The slot may also have a straight portion extending from the curved part of the slot towards the back of the trap. The side of the wall may have indicia on it. The indicia may be in the form of dimples 118 or text 119. Other forms of indicia may also be used, for example, stickers with dots on them, or different color markings. The indicia may indicate when the trap is latched or set, when the trap is unlatched or not set, and when a rodent or mouse has been caught. The set arm may be used to set the trap. As shown in FIG. 6A, the set arm is in the unlatched position. When force is applied to the set arm 116, the set arm 116 may move downwards through the slot 117 to a latched position (as shown in FIG. 6B). When a rodent is trapped within the trap 100, the set arm 116 may be position between the top and bottom edges of the area with the indicia.

Figure 7:
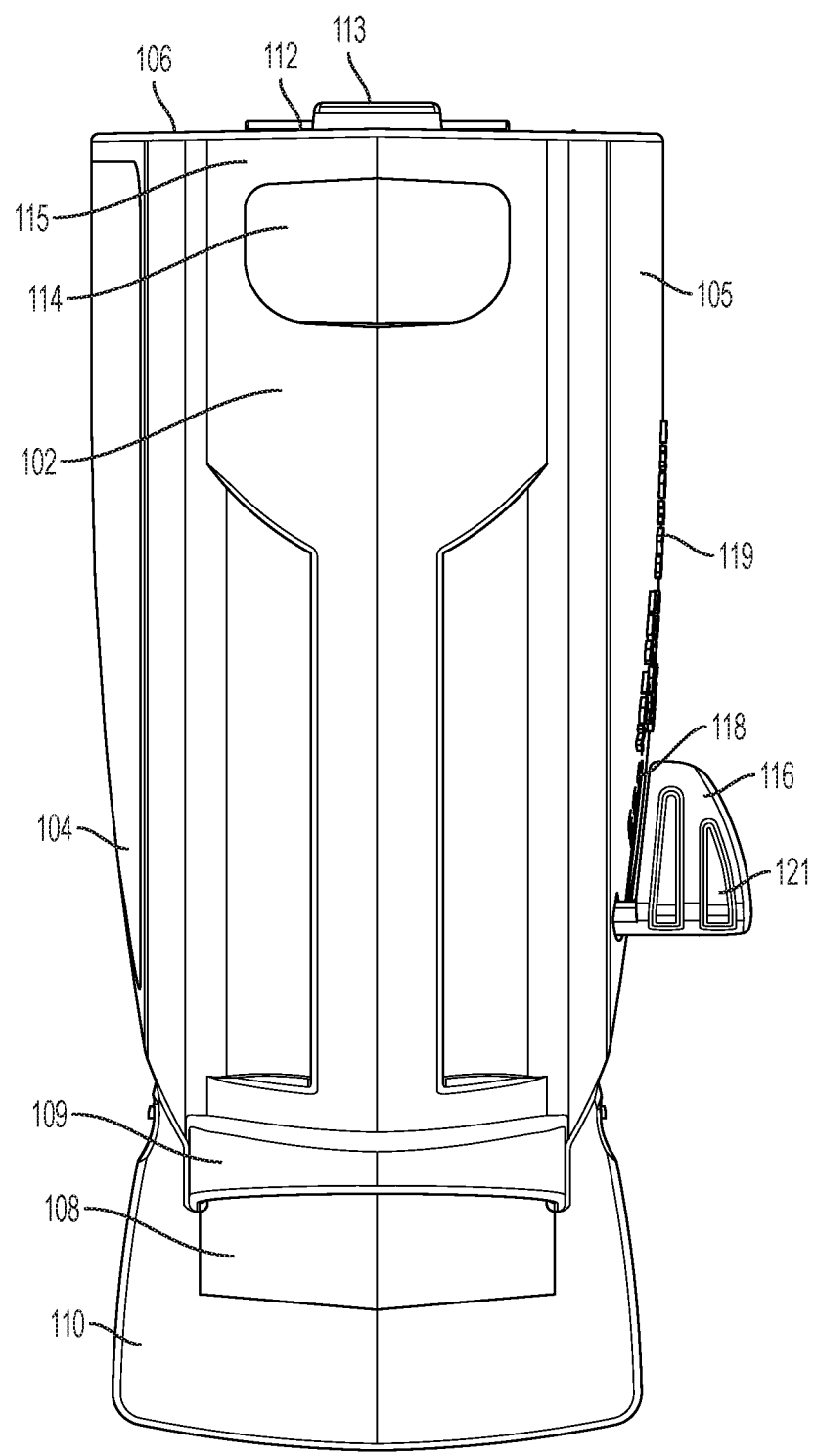
FIG. 7 depicts a top view of a trap in accordance with an exemplary embodiment.

FIG. 7 is a top view of a trap in accordance with an exemplary embodiment. The top view shows the roof 102, the location of the arched covering 109 over the entrance, the platform 110, and entrance ramp 108. The set arm 116 extending from one side of the trap is also visible from the top view. The set arm may extend from either side of the trap, or in an alternative embodiment, there may be a set arm extending from both sides of the trap. The set arm may have indentations 121 or other structure on it, such as a rubberized coating, to help the user maintain contact with it while setting the trap.

Figure 9:
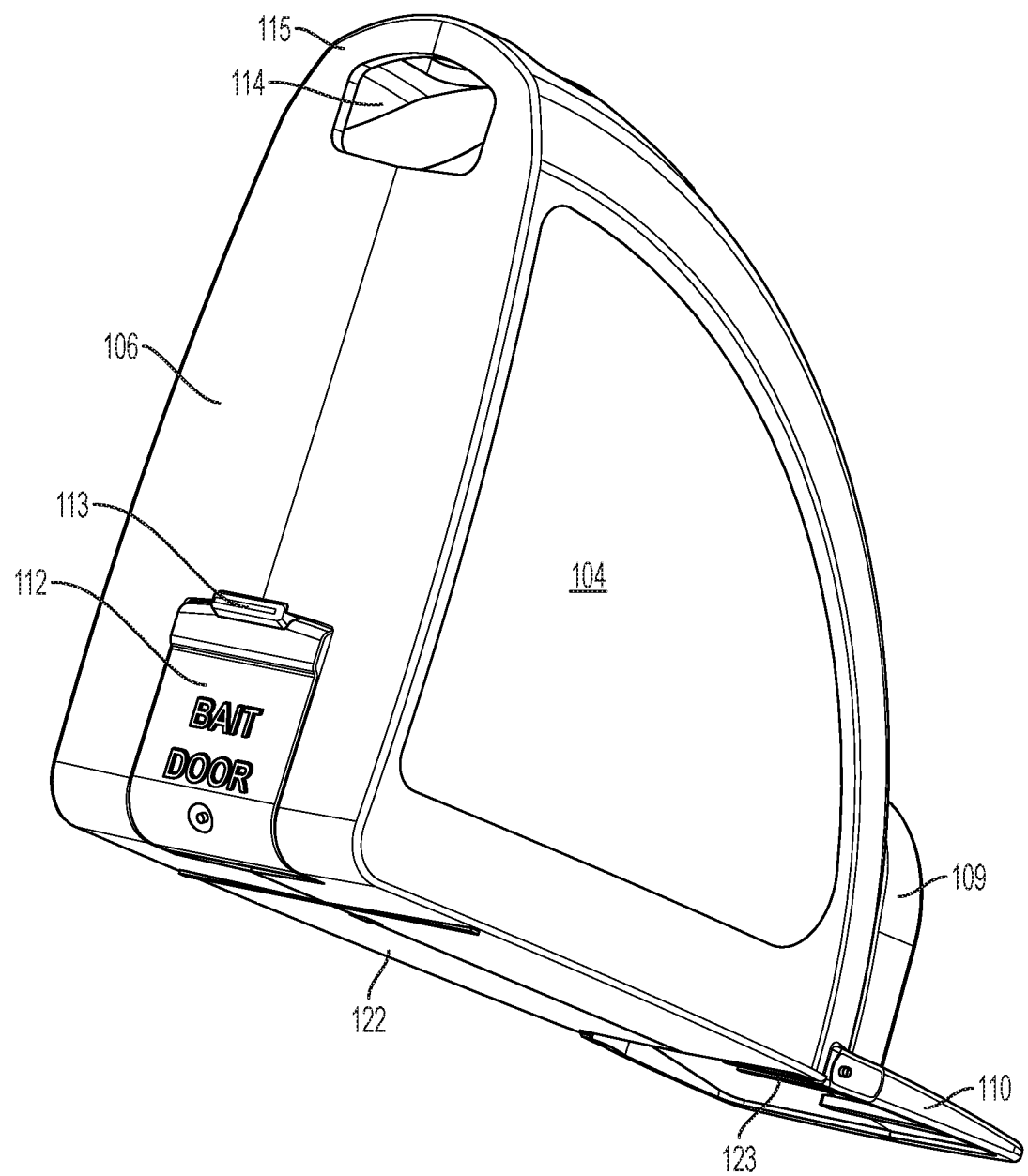
FIG. 9 depicts a perspective view of a trap in accordance with an exemplary embodiment.

FIG. 9 illustrates another perspective view of an exemplary embodiment of a rat trap. This view illustrates the bait trap door 112 in the closed position and the opening 114 near the top of the trap. This opening 114 may be used as a convenient "grab tab" of the device, to allow the user to easily dispose of it once triggered, with minimum hands-on contact to the device. It may also be used for hanging the device on display when it is being offered for sale, or for home storage. The opening may also provide an additional means for the user to hold on to the device. Opening 114 is optional.

Figure 8:
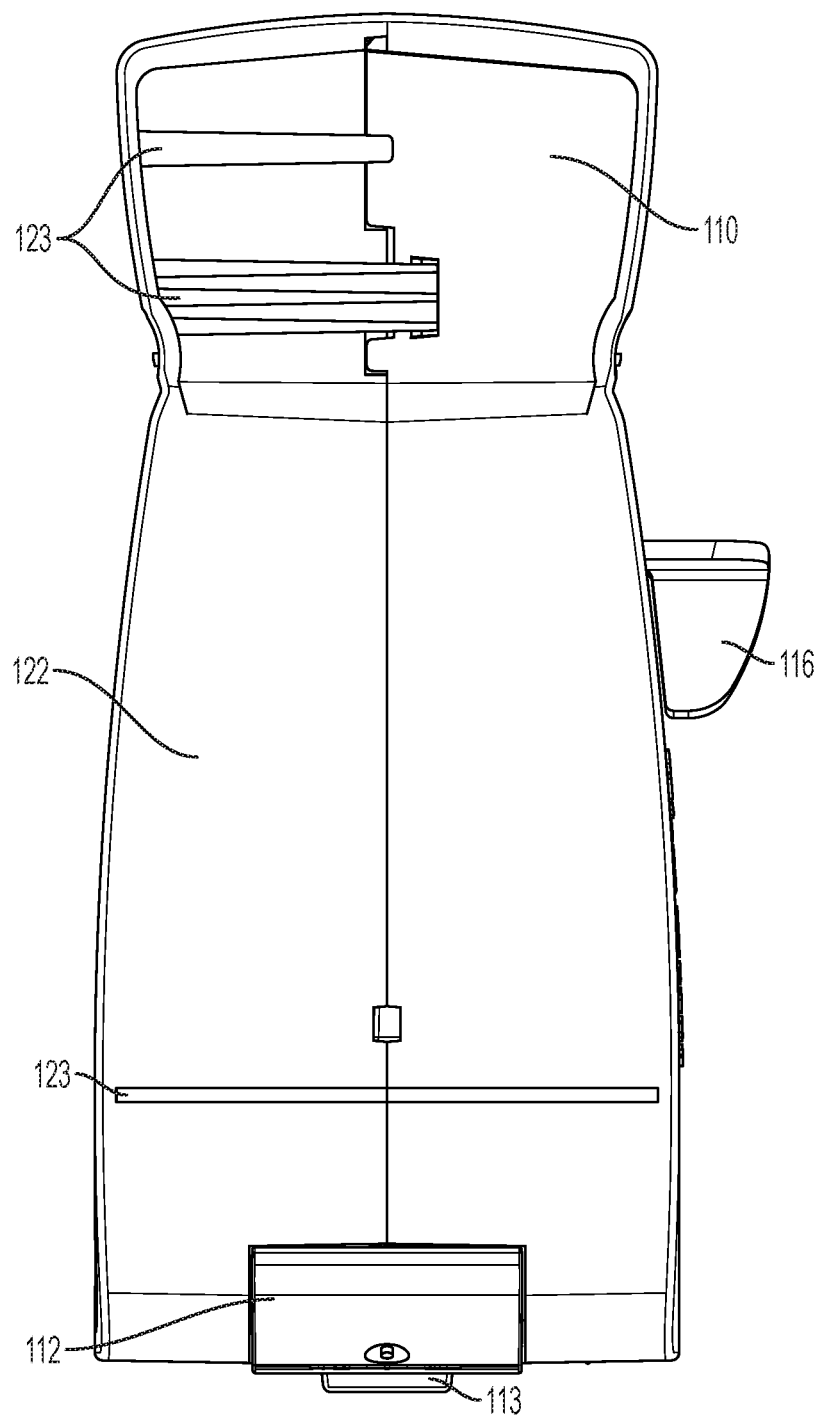
FIG. 8 depicts a bottom view of a trap in accordance with an exemplary embodiment.

FIG. 8 is a bottom view of a trap in accordance with an exemplary embodiment. The bottom surface of the trap, i.e., the bottom external surface of the base, 122 may be a generally flat surface. The bottom surface of the trap may also be a textured surface, such as a ribbed or corrugated surface, to prevent slippage of the trap once it is positioned. The bottom surface may have one or more ribs 123 on it. The bottom surface of the trap may also be coated with a rubberized or other non-slip coating. The bottom portion of the bait door 112 may be flush with the bottom surface of the trap. The bottom surface has extending from it the platform 110 for the entrance to the trap. This platform may also have ribs 123 on it. The bottom surface of the platform may be indented from the bottom surface of the body of the trap, and the ridges may provide the points of contact between the bottom of the platform and the surface upon which the trap is placed. There may also be one or more openings in the bottom surface of the trap.

The platform 110 of the trap entrance may be formed from the same pieces as the sides or bottom of the rat trap body. In the alternative, the platform may also be formed from a separate piece of material than the rest of the body and attached to the body of the trap. The platform may be attached by glue or other adhesive, by a snap-fit connection, or by prongs extending from the platform that fit into holes in the body.

Figure 10A:
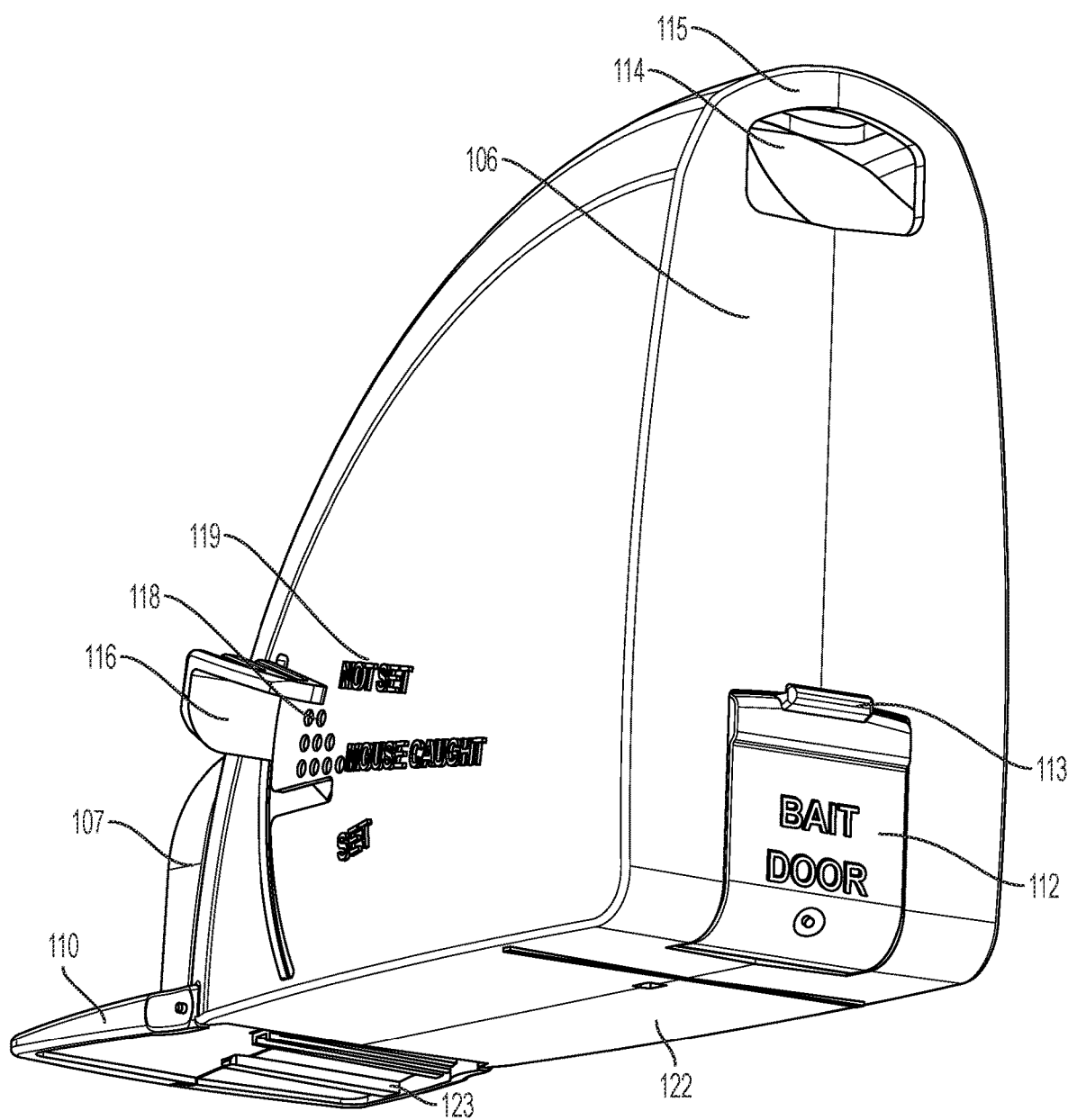
FIG. 10A depicts another perspective view of a trap in an unlatched position in accordance with an exemplary embodiment.

FIG. 10A provides another perspective view of an exemplary embodiment of the trap 100. In this view, the trap is in the unlatched position. The set arm 116 and indicia 118, 119 may be on either one of, or both, sides of the trap.

Figure 10B:
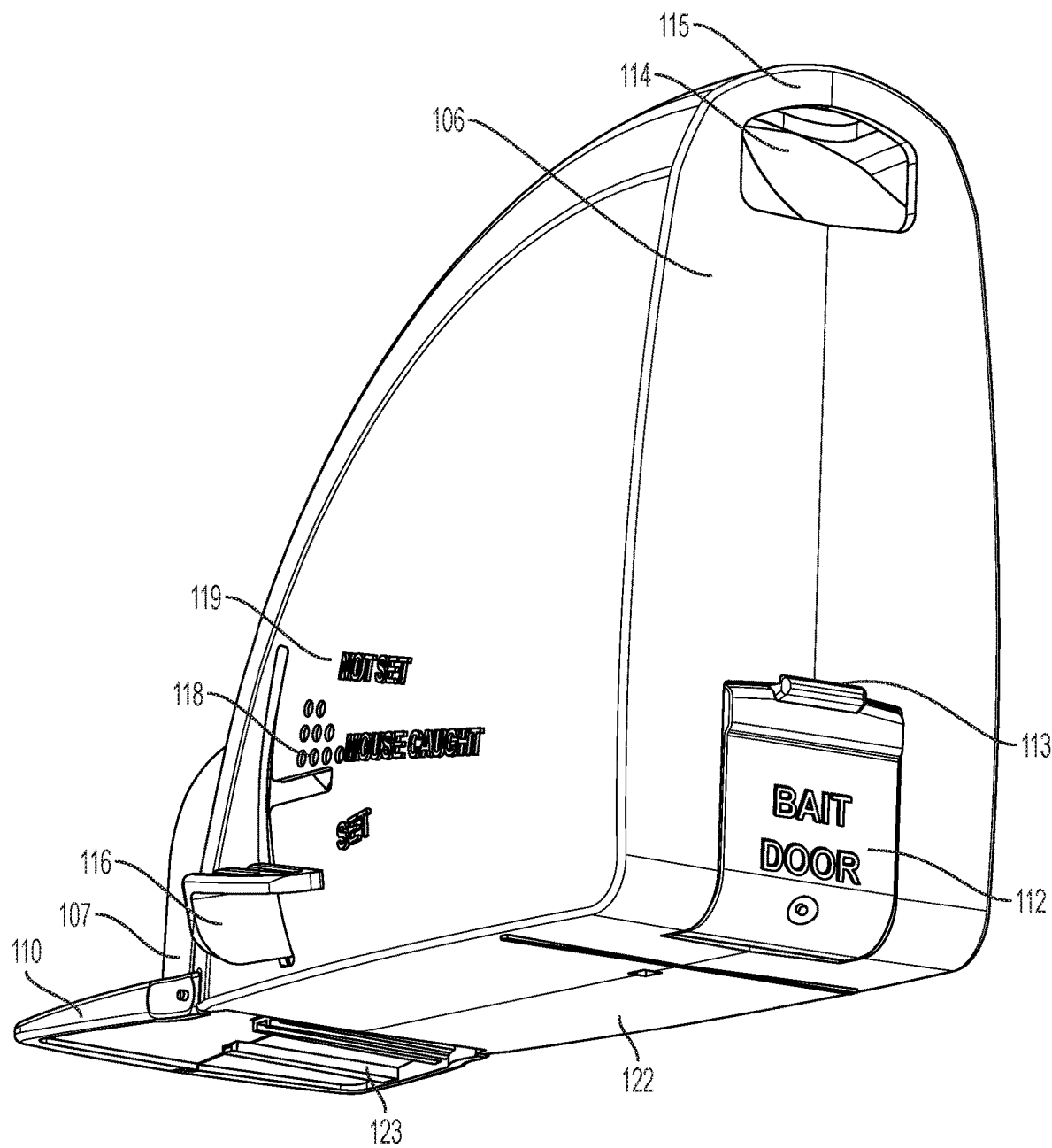
FIG. 10B depicts another perspective view of a trap in a set position in accordance with an exemplary embodiment.

FIG. 10B provides a perspective view of the trap in the set position. In this figure, the set arm 116 is located at the text indicia that reads "set" to indicate the trap has been set.

Figure 10C:
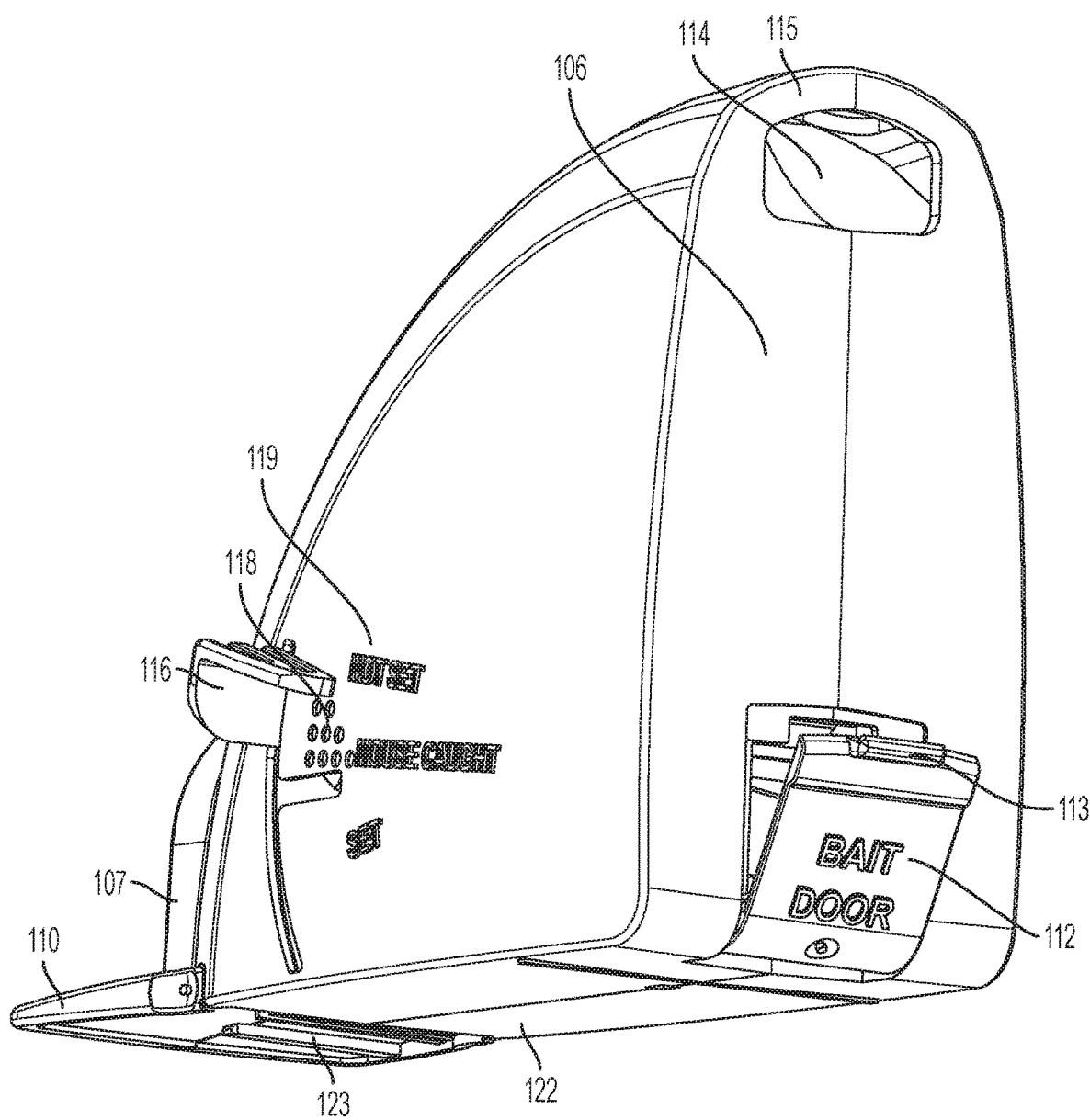
FIG. 10C depicts another perspective view of a trap in an unlatched position, with an open bait door, in accordance with an exemplary embodiment.

FIG. 10C provides a perspective view of an exemplary embodiment of the trap with the bait door 112 in an open position.

Figure 11:
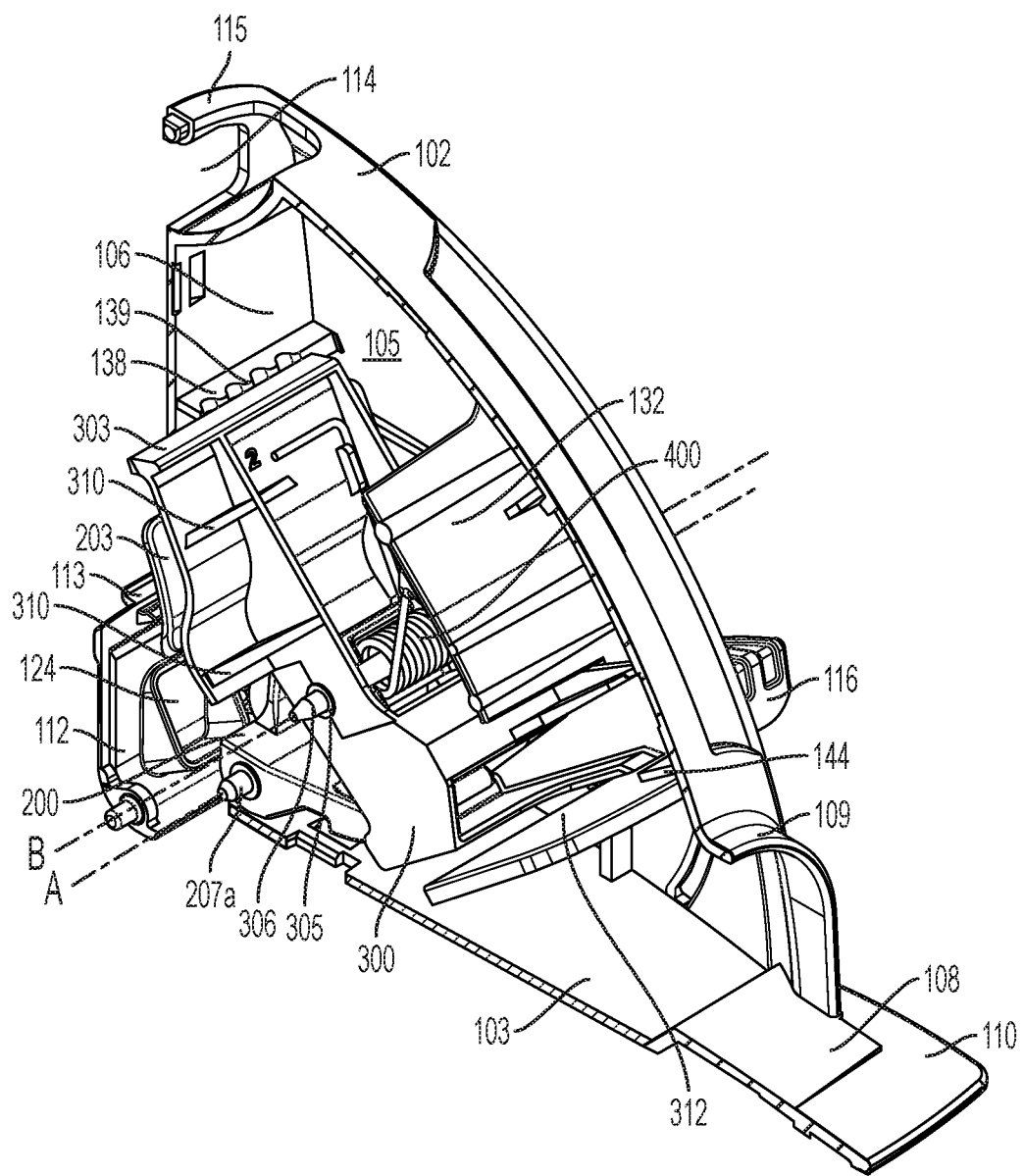
FIG. 11 depicts a perspective view of a trap, without a sidewall, in accordance with an exemplary embodiment.

Referring to FIG. 11, a perspective view of the trap in an unlatched position, without a sidewall, in accordance with an exemplary embodiment is illustrated.

Figure 12A:
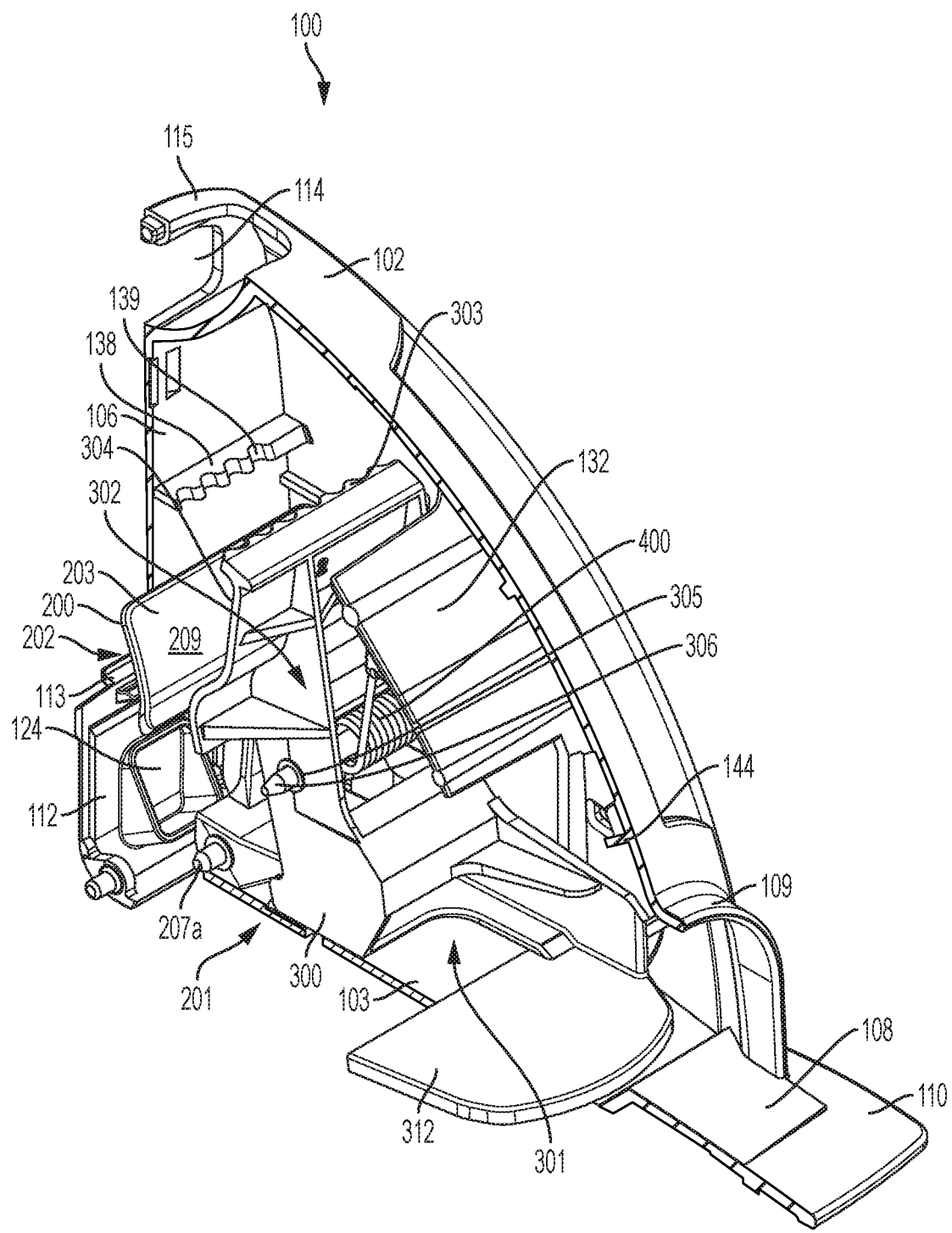
FIG. 12A depicts a perspective view of a trap, without a sidewall, in a set position, in accordance with an exemplary embodiment.

Referring to FIG. 12A, a perspective view of the trap in a set position, without a sidewall, in accordance with an exemplary embodiment is illustrated. FIG. 12C is a similar view as FIG. 12A, with the bait door 112 in an open position. Attractant reservoir 124 is visible in this view.

Figure 13:
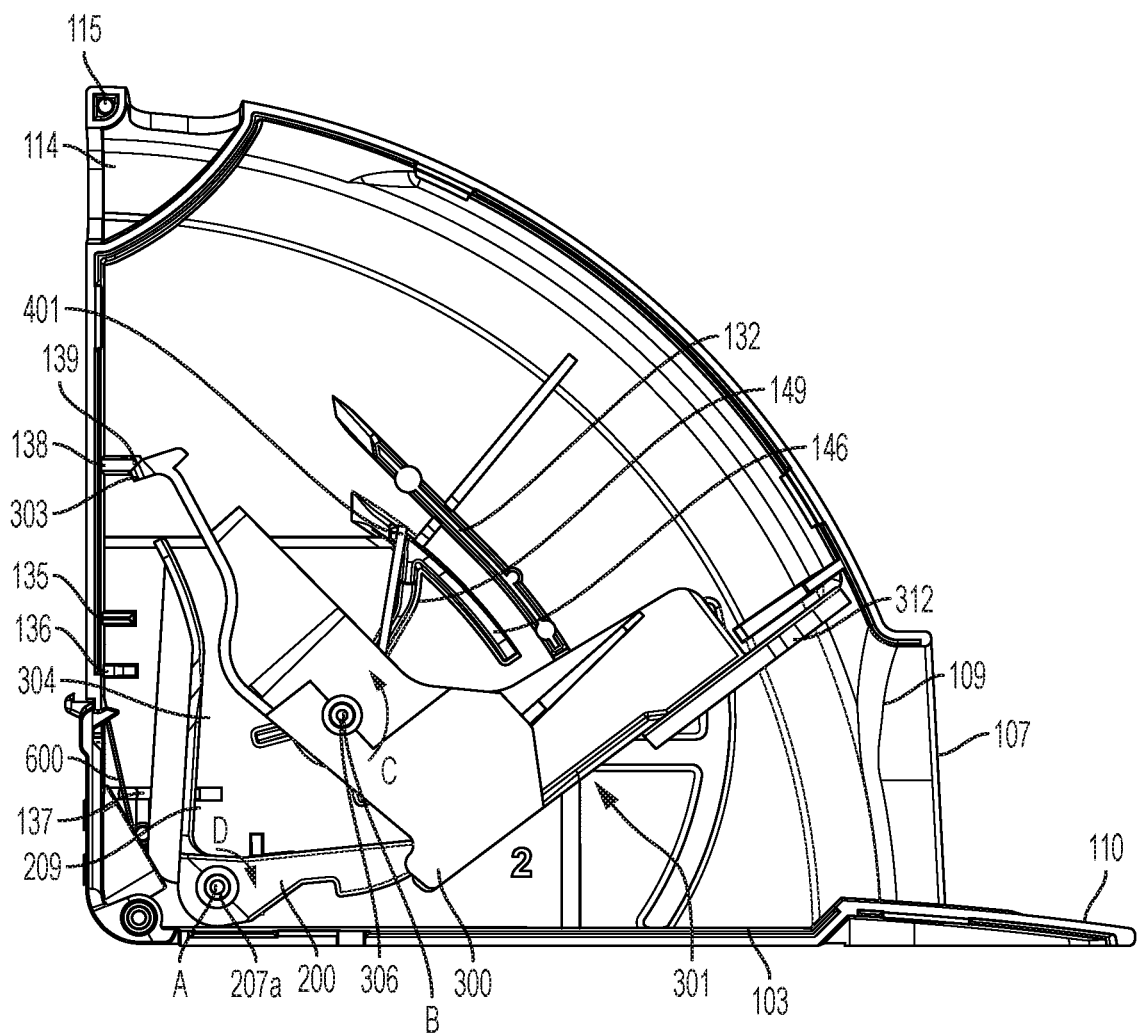
FIG. 13 depicts a side view of a trap, without a sidewall, in an unlatched position, in accordance with an exemplary embodiment.

Referring to FIG. 13, a side view of the trap, without a side wall, in the unlatched position, in accordance with an exemplary embodiment is illustrated.

Figure 14A:
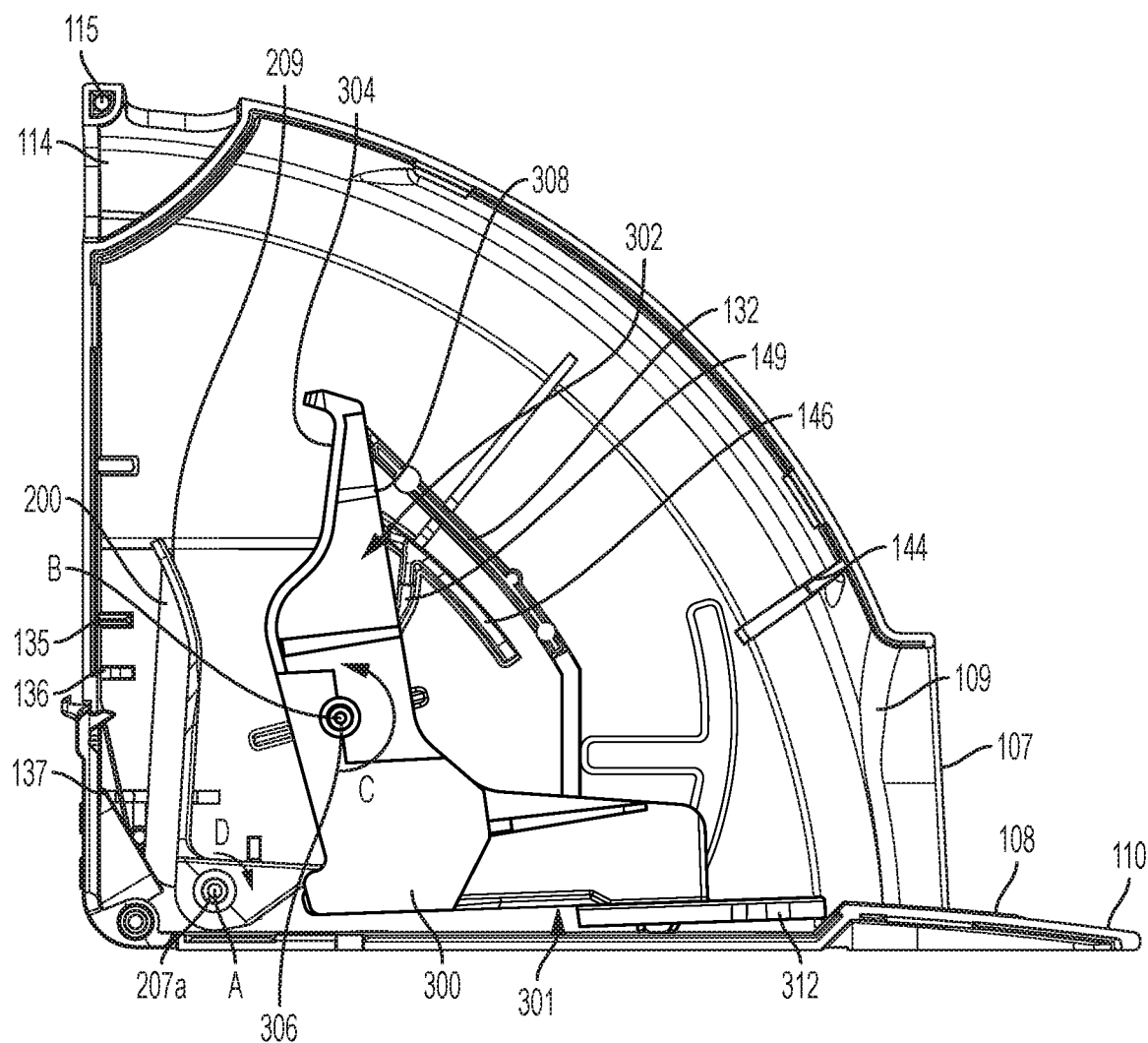
FIG. 14A depicts a side view of a trap, without a sidewall, in a set position, in accordance with an exemplary embodiment.

Referring to FIG. 14A, a side view of the trap, without a side wall, in the set position, in accordance with an exemplary embodiment is illustrated.

As shown in FIGS. 12A and 14A, one embodiment of the trap 100 may include a trigger structure 200 with a horizontal component 201, a vertical component 202, a first extension 207a, and a second extension 207b aligned along a first axis A with the first extension. The trigger structure 200 may comprise a single integral component or multiple components comprising the structure. In this embodiment, the first and second extensions 207a and 207b are located where the horizontal component and vertical component meet and extend in opposite directions from the trigger structure along the first axis A. The first and second extensions 207a and 207b are configured to couple the trigger structure to the housing such that the trigger structure may move, rotate, and/or pivot about the first axis A relative to the housing. In other embodiments, the first and second extensions 207a and 207b may comprise a single rod or axle that is integral to, or in other embodiments, separate from the triggering structure 200. In yet other embodiments, the triggering structure 200 may not include the extensions, but rather a channel configured to receive extensions or a rod extending from one or both of the first side wall 104 and/or second side wall 105. In other embodiments, the rod may be a rod or axle that is separate and discrete from both the trigger structure and the housing and movably, rotatably, and/or pivotably connects the trigger structure 200 to the first and second side walls 104 and 105, respectively. In other embodiments, the first and second extensions 207a and 207b or the rod may include one or more threaded ends.

Figure 14B:
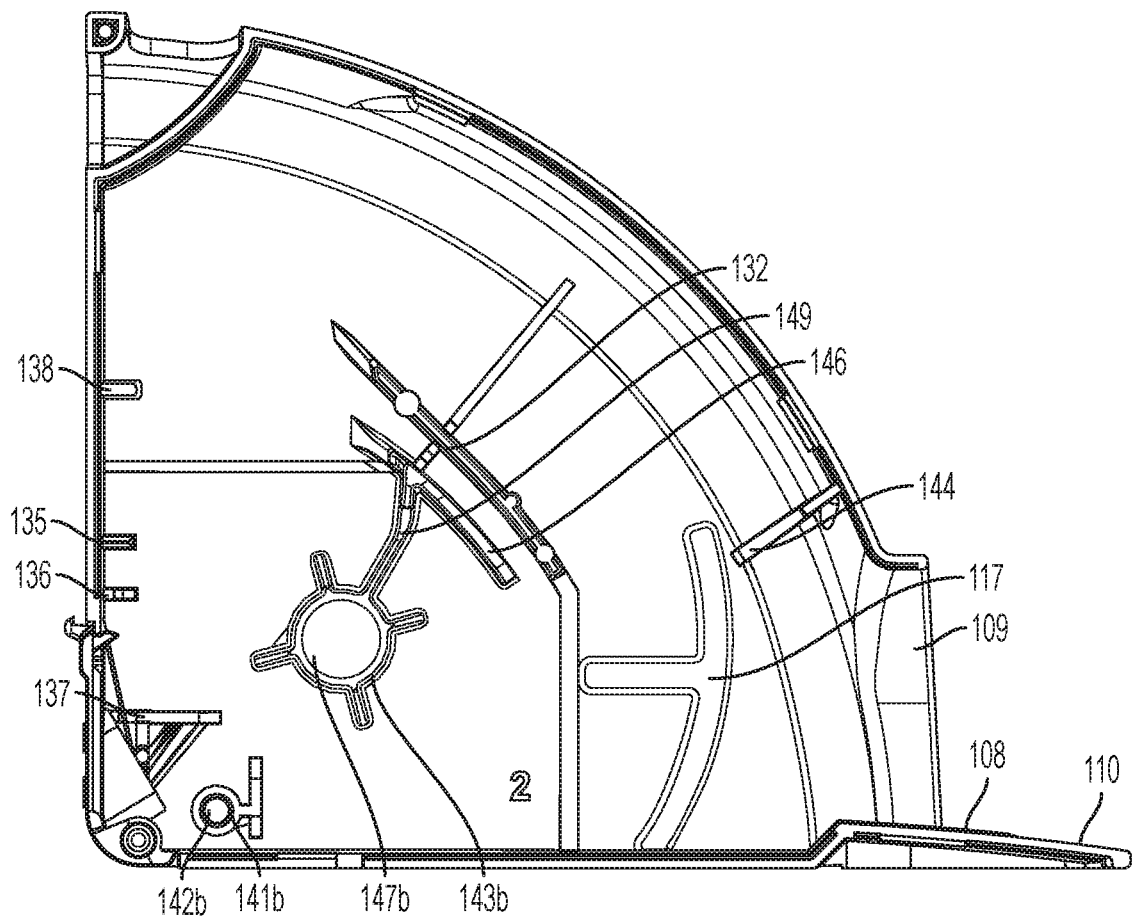
FIG. 14B depicts a side view of a part of the housing of the trap, in accordance with an exemplary embodiment.
Figure 23A:
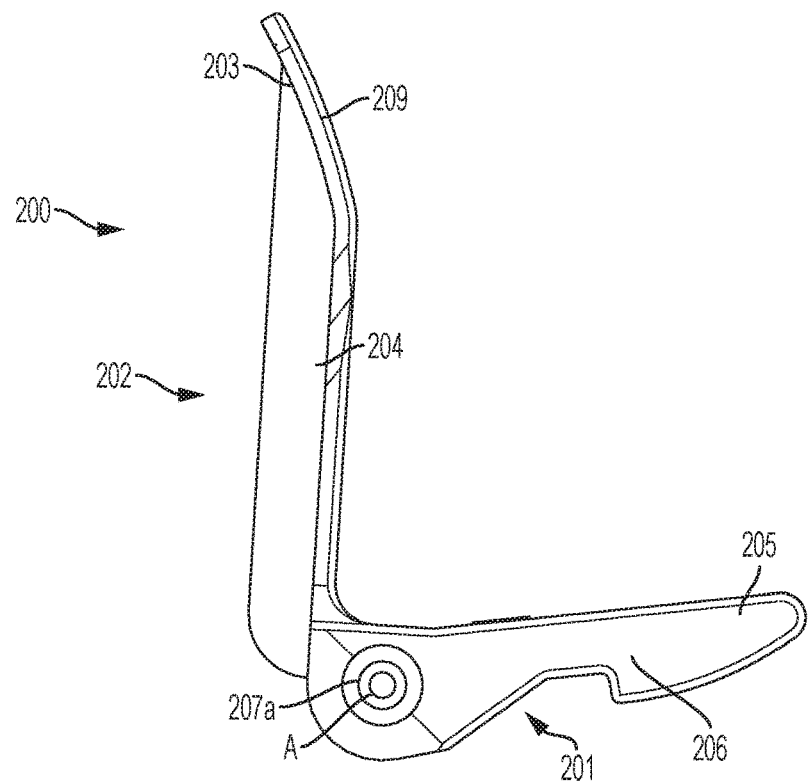
FIG. 23A depicts a trigger structure of the trap in accordance with an exemplary embodiment.
Figure 23B:
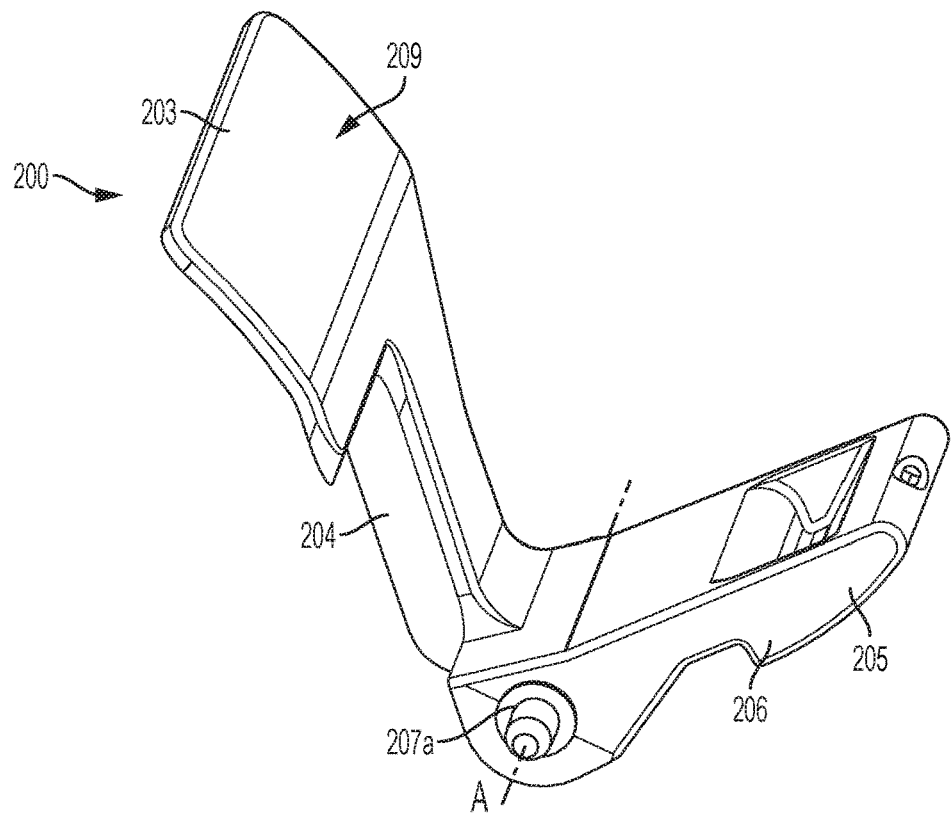
FIG. 23B depicts a perspective view of a trigger structure in accordance with an exemplary embodiment.

FIG. 23A depicts a side view of an exemplary embodiment of the trigger structure 200. FIG. 23B depicts a perspective view of an exemplary embodiment of the trigger structure. As shown, the vertical component 202 may include a vertical arm 204 and a trigger plate 203 connected to the vertical arm. In some embodiments, the trigger plate 203 is disposed at or near the distal end of the vertical arm 204. The trigger plate 203 may include a vertical surface area 209 as shown in FIGS. 23A and 23B, for example. The horizontal component may also include a latch mechanism 205 with a prong 206. As discussed, the first and second extensions 207a and 207b, respectively, may movably, rotatably, and/or pivotably couple with and be received within respective extension receptacles 142a and 142b (as shown in FIGS. 14B and 16B) disposed on the first and second side walls 104 and 105, respectively, permitting the trigger structure 200 to move, rotate, and/or pivot within and relative to the housing. In some embodiments, the first and second side walls 104 and 105 may include protrusions 141a and 141b, respectively, extending inwardly therefrom, wherein the extension receptacles 142a and 142b are disposed in distal ends of each of protrusion 141a and 141b, respectively, as shown in FIGS. 14B and 16B. The openings 142a and 142b may be sized appropriately to hold the ends of the extensions or rod and allow the extensions or rod to rotate as the trigger structure pivots within the housing.

In other embodiments, the extensions may be positioned on the respective first and second housings and the extension receptacles may be positioned on the respective sides of the trigger structure 200 in place of the first and second extensions 207a and 207b, respectively.

Figure 12B:
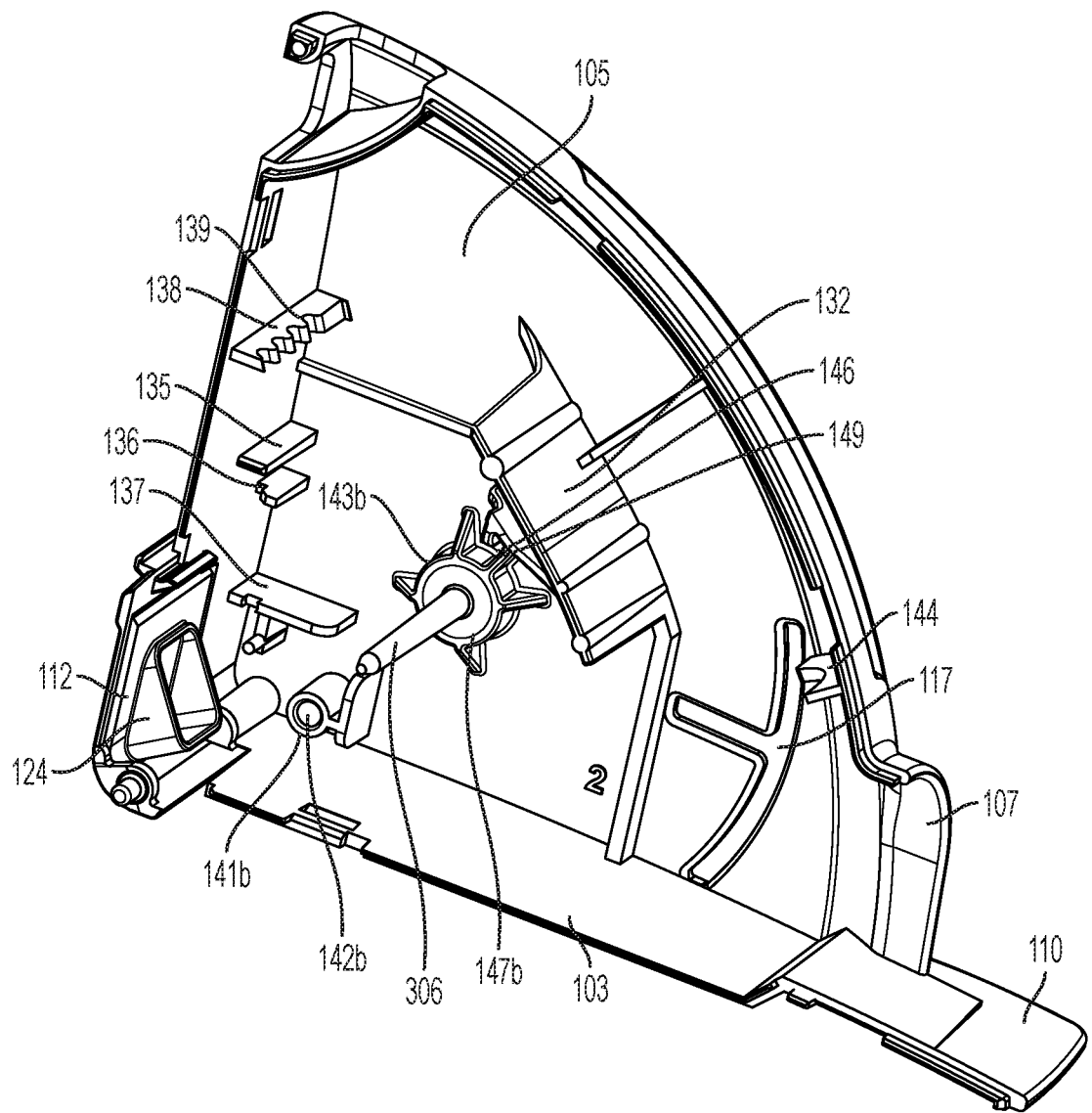
FIG. 12B depicts a perspective view of a part of the housing of the trap, in accordance with an exemplary embodiment.
Figure 12C:
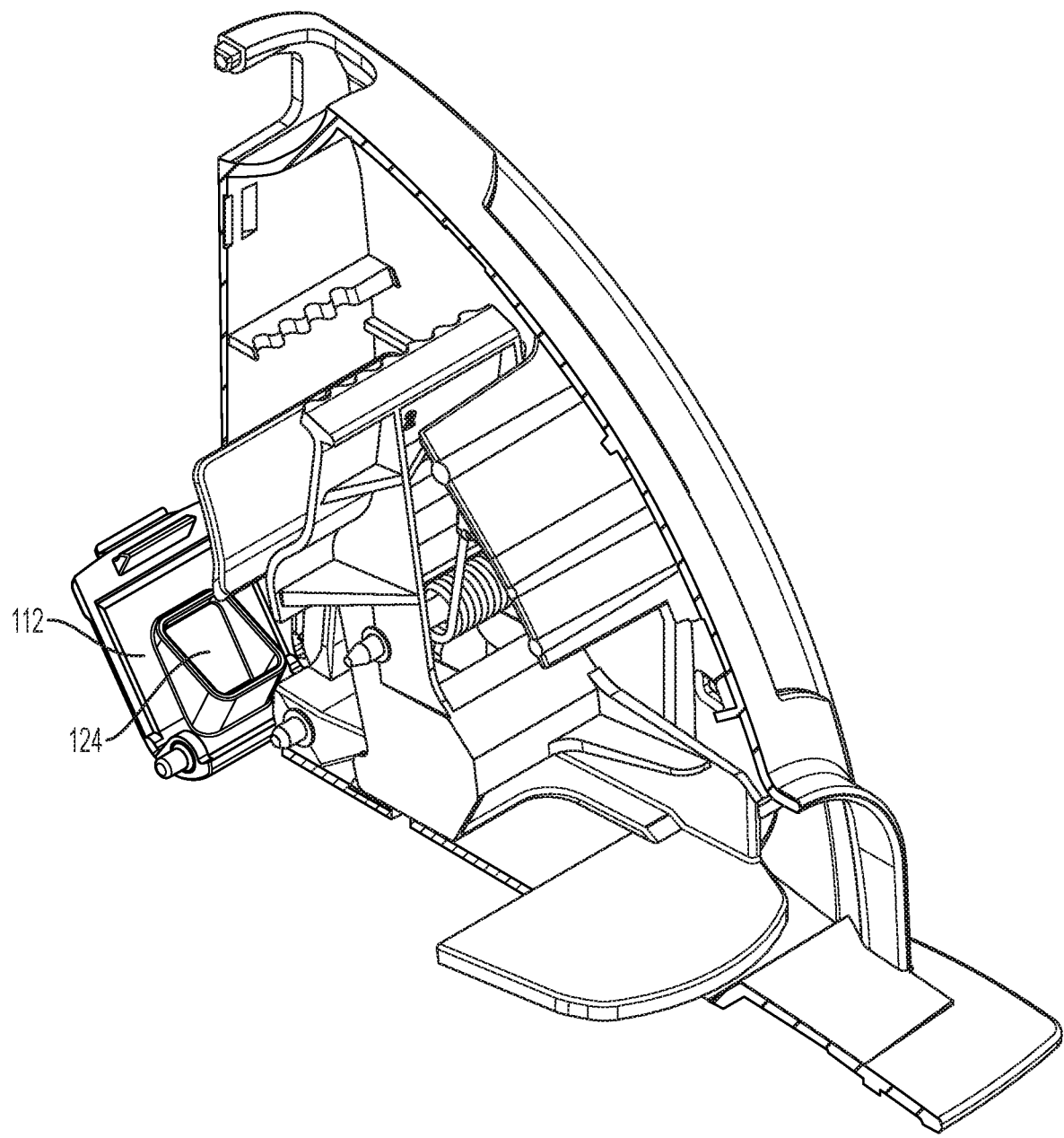
FIG. 12C depicts a perspective view of a trap, without a side wall, in a set position, with an open bait trap door, in accordance with an exemplary embodiment.
Figure 18A:
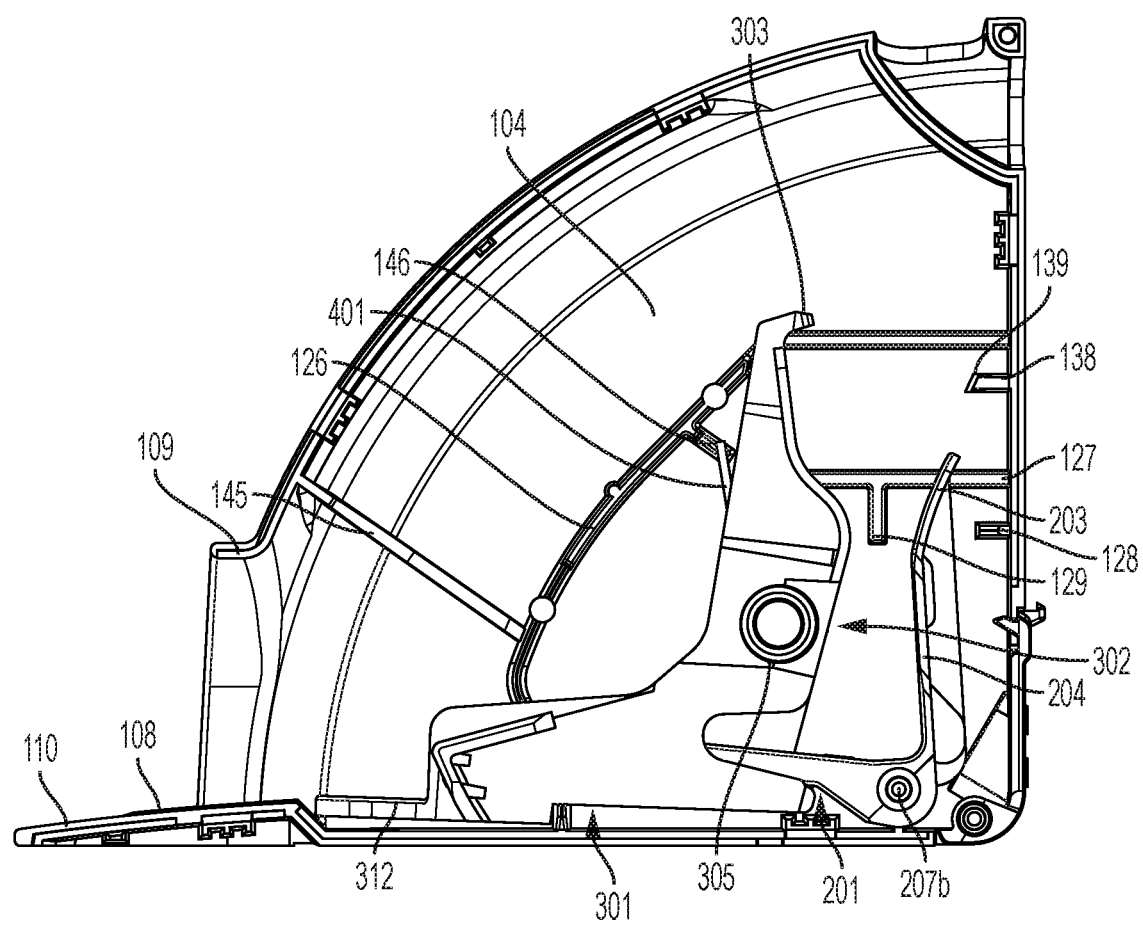
FIG. 18A depicts a side view of a trap without a side wall, in a set position, in accordance with an exemplary embodiment.
Figure 18B:
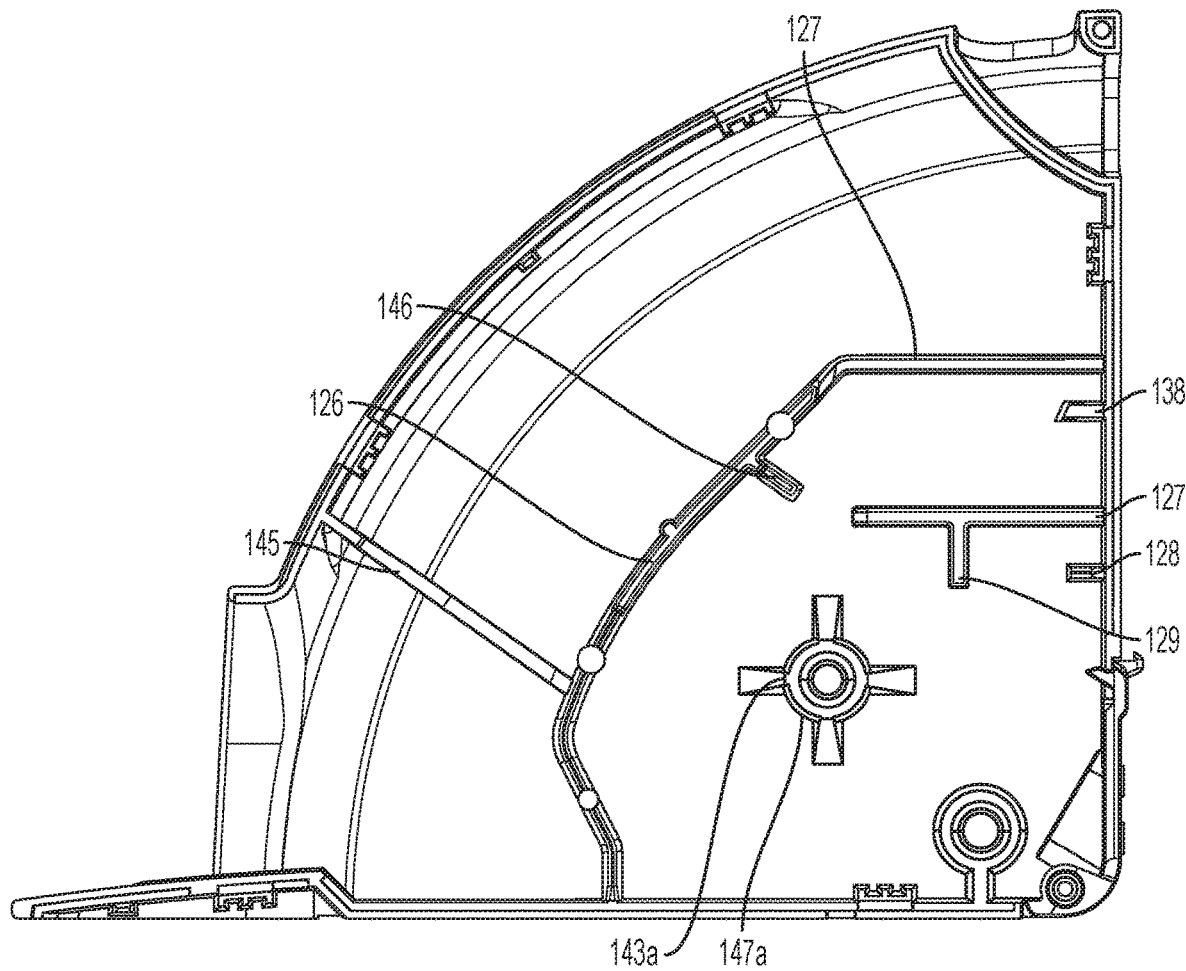
FIG. 18B depicts a side view of a part of the housing of a trap in accordance with an exemplary embodiment.

FIGS. 12B and 14B illustrate the inside view of the second side wall 105. FIGS. 16B and 18B illustrate the inside view of the first side wall 104. The trap 100 may also include a pivoting structure 300 movably, rotatably, and/or pivotally coupled to and/or within the housing 101. In some embodiments, the pivoting structure 300 is coupled to the first and second side walls 104 and 105, respectively, such that it may move, rotate, and/or pivot about a second axis B within and relative to the housing. The pivoting structure 300 may be coupled to the first and second side walls 104 and 105, respectively, at a location that is different from the location that the trigger structure 200 is coupled to the first and second side walls. In some embodiments, the pivoting structure 300 has a width that is less than or equal to the width of the device, between side walls 104 and 105.

Figure 24A:
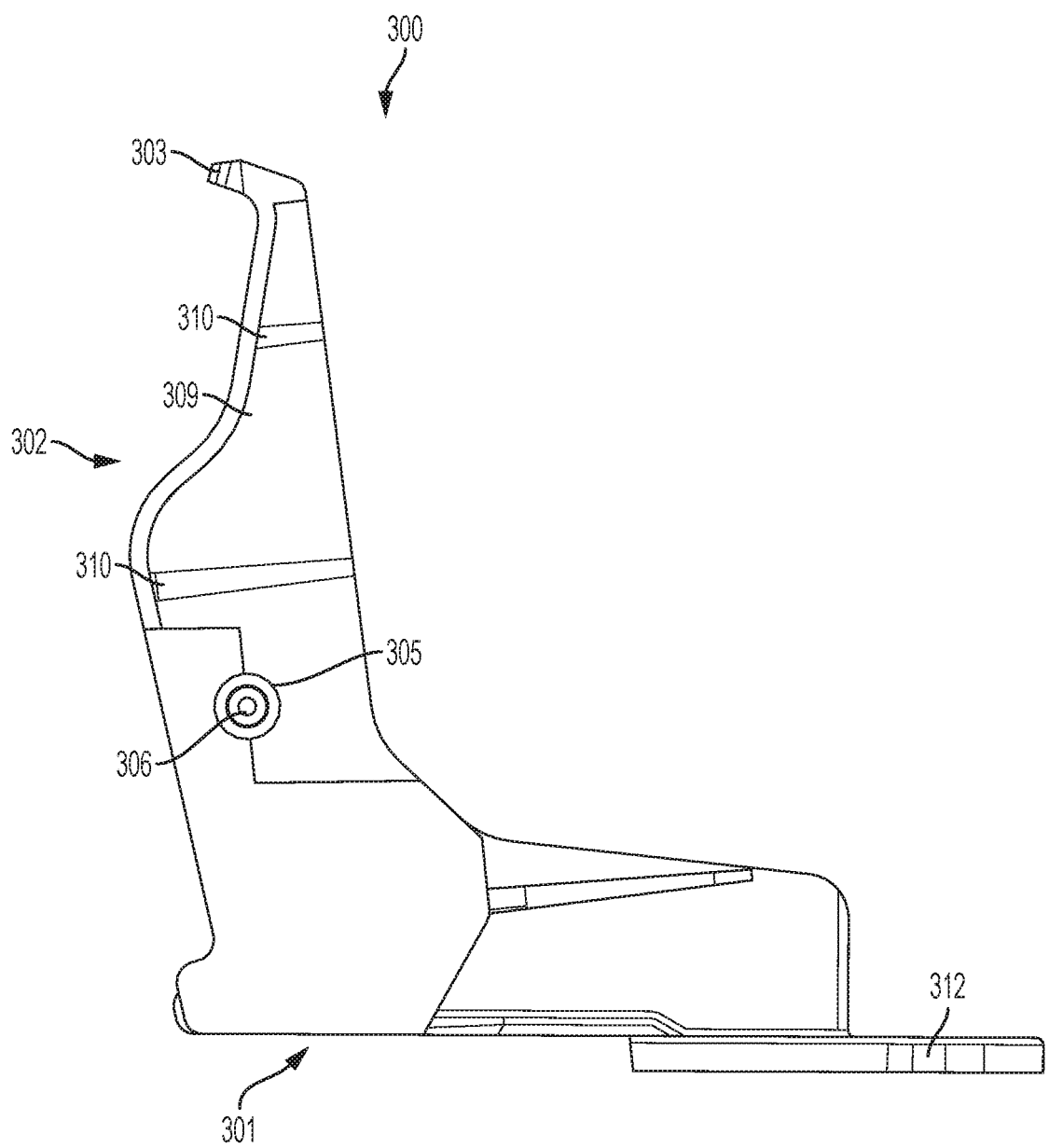
FIG. 24A depicts a side view of a pivoting structure of a trap in accordance with an exemplary embodiment.
Figure 24B:
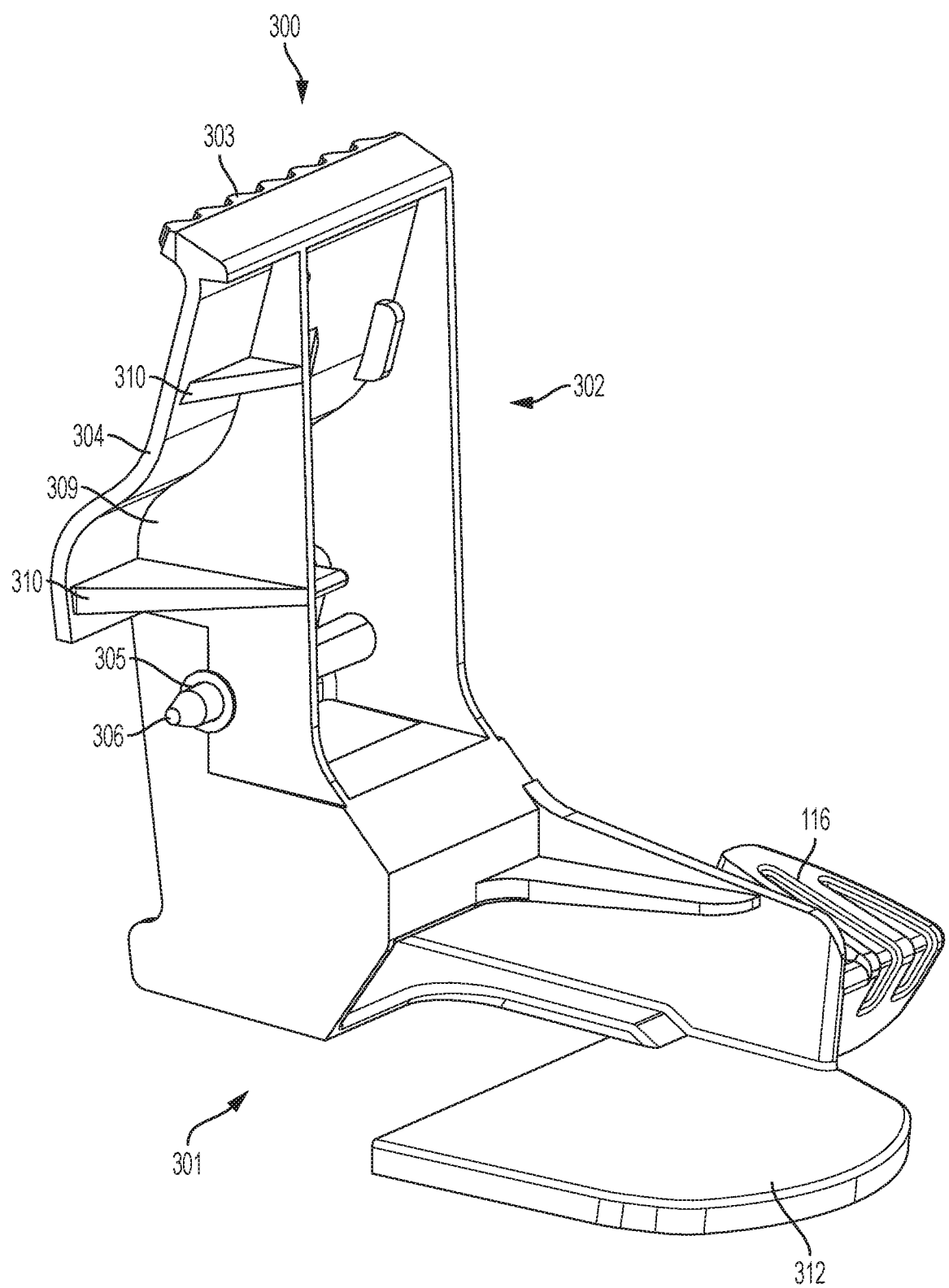
FIG. 24B depicts a perspective view of a pivoting structure of a trap in accordance with an exemplary embodiment.

FIG. 24A illustrates a side view of an exemplary embodiment of the pivoting structure. FIG. 24B illustrates a perspective view of an exemplary embodiment of a pivoting structure. The pivoting structure 300 may include a horizontal extension piece 301, a vertical extension piece 302 connected to the horizontal extension piece, and a channel 305 disposed therein. The pivoting structure 300 may comprise a single integral component or multiple components comprising the structure. In some embodiments, the horizontal extension piece 301 may include a flat paddle 312 disposed at or near its distal end and a latch surface 313 disposed at or near an end of the horizontal extension piece that is opposite the end at or near the flat paddle surface (e.g., at or near the intersection of the horizontal extension piece with the vertical extension piece). When installed within the housing 100, the horizontal extension piece 302 extends horizontally from the vertical extension piece 302 in a direction towards the entrance of the trap, when the trap is in a set position, the flat paddle 312 is located toward the portion of the horizontal extension piece closest to the entrance of the trap, and the latch surface 313 is a portion of the horizontal extension piece closest to the back wall 106 of the housing. The latch surface 313 is positioned such that the prong 206 of the trigger structure 200 engages with it and latches against it when the trap is in the set position (illustrated in FIG. 26B).

At or near a distal end of the vertical extension piece 302, the extension piece includes a serrated edge 303. When installed within the pivoting structure 300 is installed within the housing, the serrated edge 303 faces the back wall. The rear-facing surface 304 of the vertical extension piece facing the rear wall is a flat surface with a width and a height, and may have curvature to it.

In the embodiment shown in the figures, the channel 305 may be located within the vertical extension piece 302 of the pivoting structure. Referring to FIGS. 12B, 14B, and 16B, the first and second side walls 104 and 105 may include rod receptacles 147a and 147b, respectively, which are configured to receive respective ends of a rod 306. As specifically shown in FIG. 12B, in some embodiments the rod 306 may be received within and coupled to the rod receptacle 147b such that it extends inwardly from the second side wall 105. The channel 305 and rod 306 are configured such that the channel rotatably and/or pivotably receives the rod therein. The pivoting structure 300 may be coupled to the second side wall 105 by inserting the rod 306 within the channel 305. The opposite end of the rod 305 may be inserted in the rod receptacle 147a disposed within the first side wall 104, when the first and second side walls are assembled and coupled together to form the trap.

As shown, the rod receptacles 147a and 147b may be disposed within distal ends of respective protrusions 143a and 143b, extending inwardly from the respective first and second side walls 104 and 105 as shown in FIGS. 12B, 14B, and 16B. In some embodiments, the rod may include one or two threaded ends. Instead of a rod or separate axle, in some embodiments, one or more of the side walls (i.e., 104 and 105) may include one or more protrusions or rods that are integral to and extend inwardly from such one or more side walls. In some embodiments, the channel 305 may include a slot (not shown) to receive the rod 306. In some embodiments, the pivoting structure 300 may include one or more extensions, instead of the rod or axle, extending from the pivoting structure. The one or more extensions may be movably, rotatably, and/or pivotably received within the respective rod receptacles 147a and 147b.

The extension receptacles 142a and 142b and the rod receptacles 147a and 147b may be sized appropriately to hold the ends of the extensions 207a and 207b and the rod 306 and to allow the extensions and rod to rotate and/or pivot as the respective trigger structure 200 and pivoting structure 300 pivot within and relative to the housing.

In other embodiments, threaded ends of a rod used to pivotably couple the trigger structure to the housing and/or the rod 306 used to pivotably couple the pivoting structure to the housing may extend beyond the first and second sidewalls, 104, 105. A nut may secure each threaded end of the rods to the housing 101. In still other embodiments, a screw may be used in conjunction with or in place of the rods and/or first and second extensions. In such an embodiment, the screw head and a nut on the threaded end of the screw may secure the screw to the housing 101. It is understood that other conventional and/or yet-to-be developed assemblies and mechanisms that movably, rotatably, and/or pivotably couple the trigger structure and the pivoting structure to the housing may be used with the one or more embodiments of the trap disclosed herein.

Figure 15:
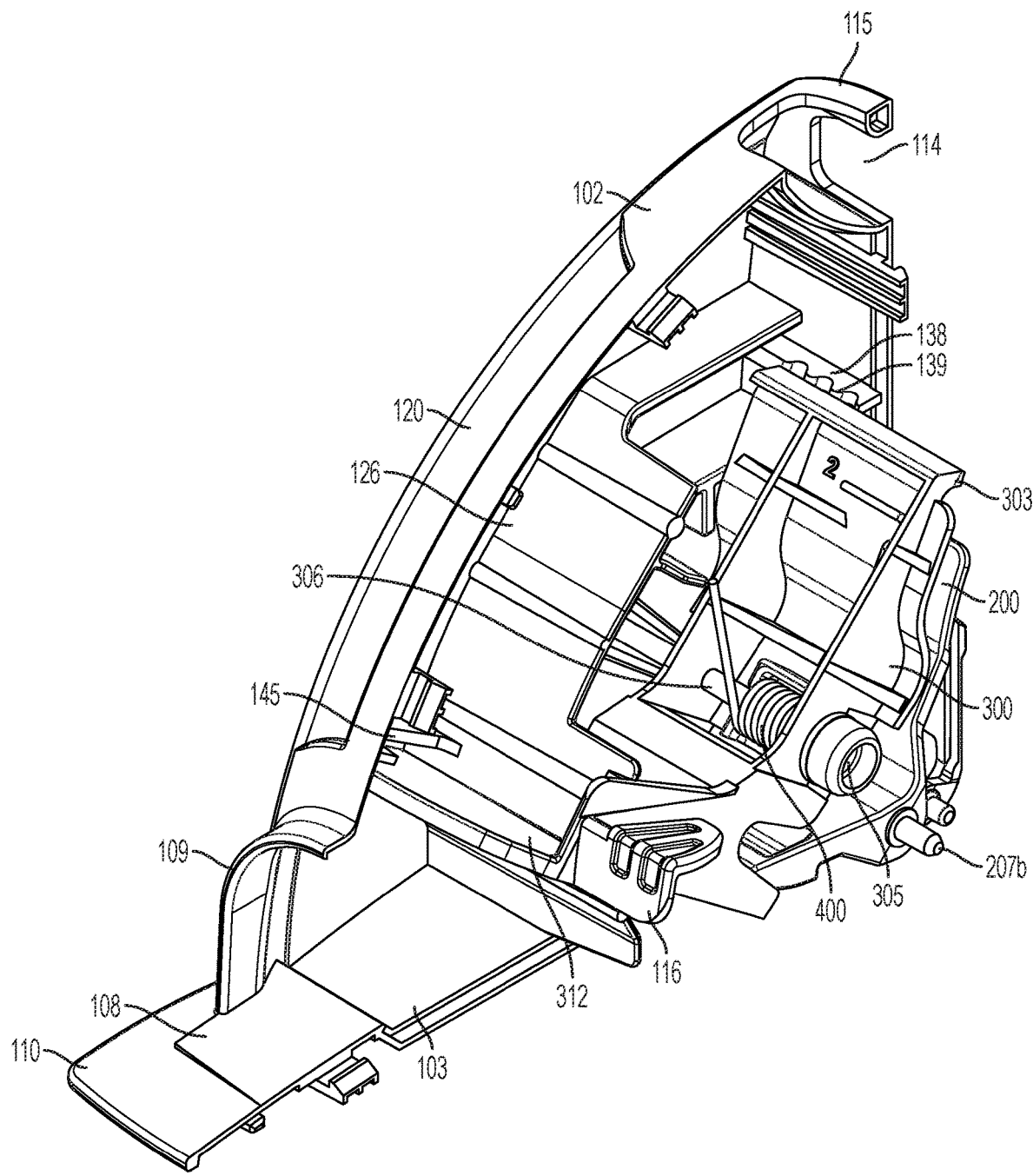
FIG. 15 depicts a perspective view of a trap with a biasing element, without a sidewall, in an unlatched position, in accordance with an exemplary embodiment.
Figure 16A:
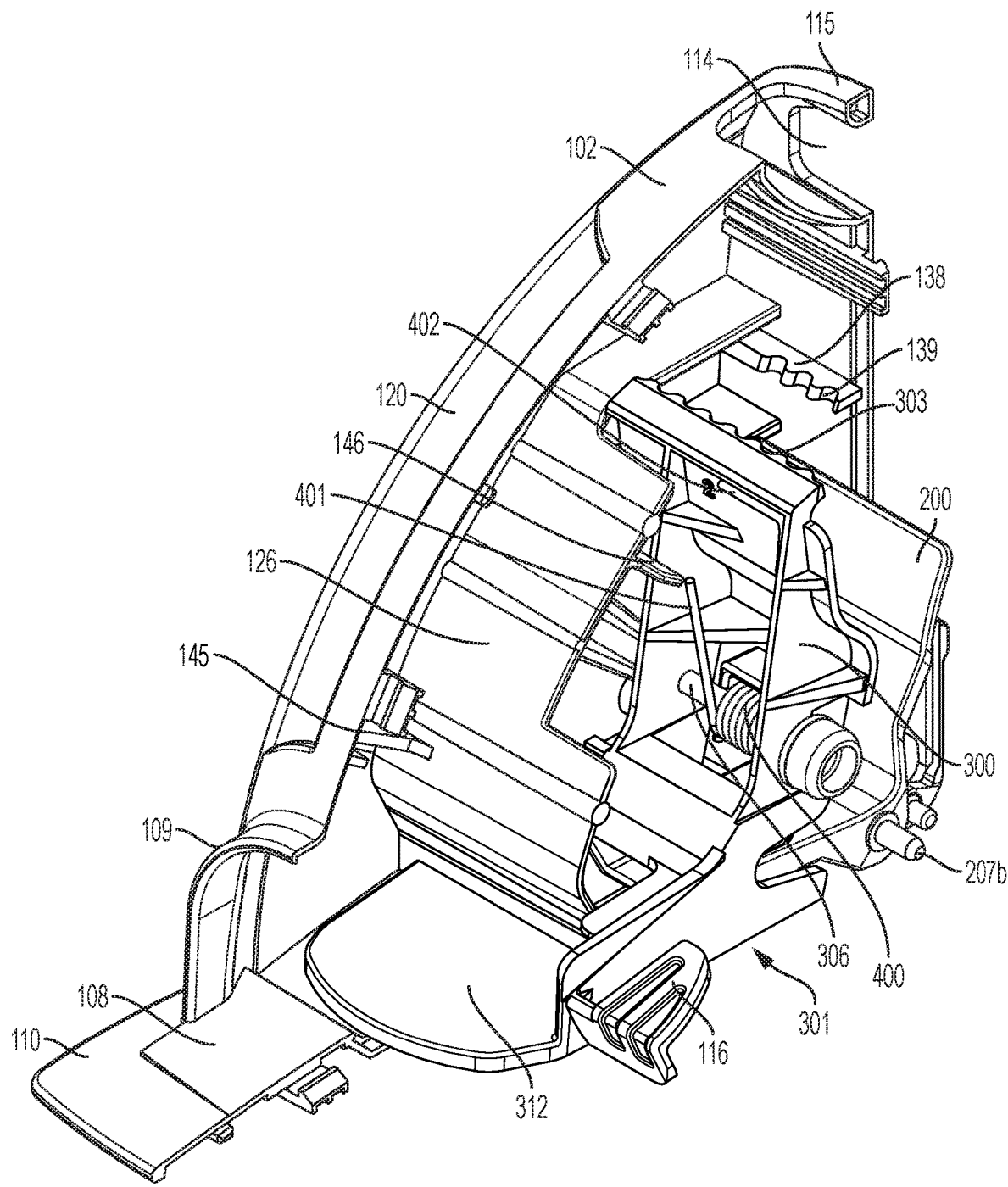
FIG. 16A depicts a perspective view of a trap with a biasing element, without a sidewall, in an set position, in accordance with an exemplary embodiment.
Figure 16B:
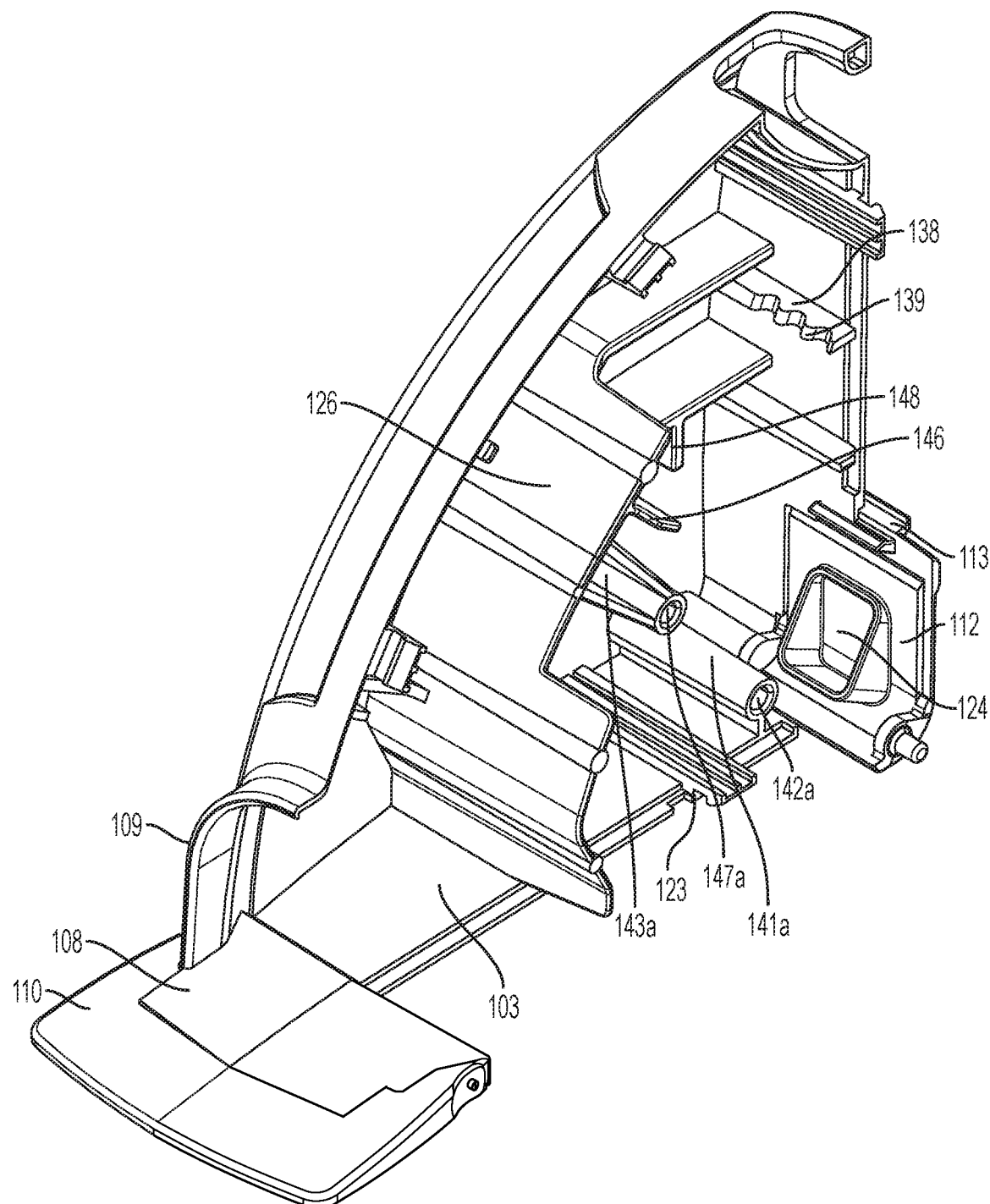
FIG. 16B depicts a perspective view of another part of the housing of the trap, in accordance with an exemplary embodiment.
Figure 19:
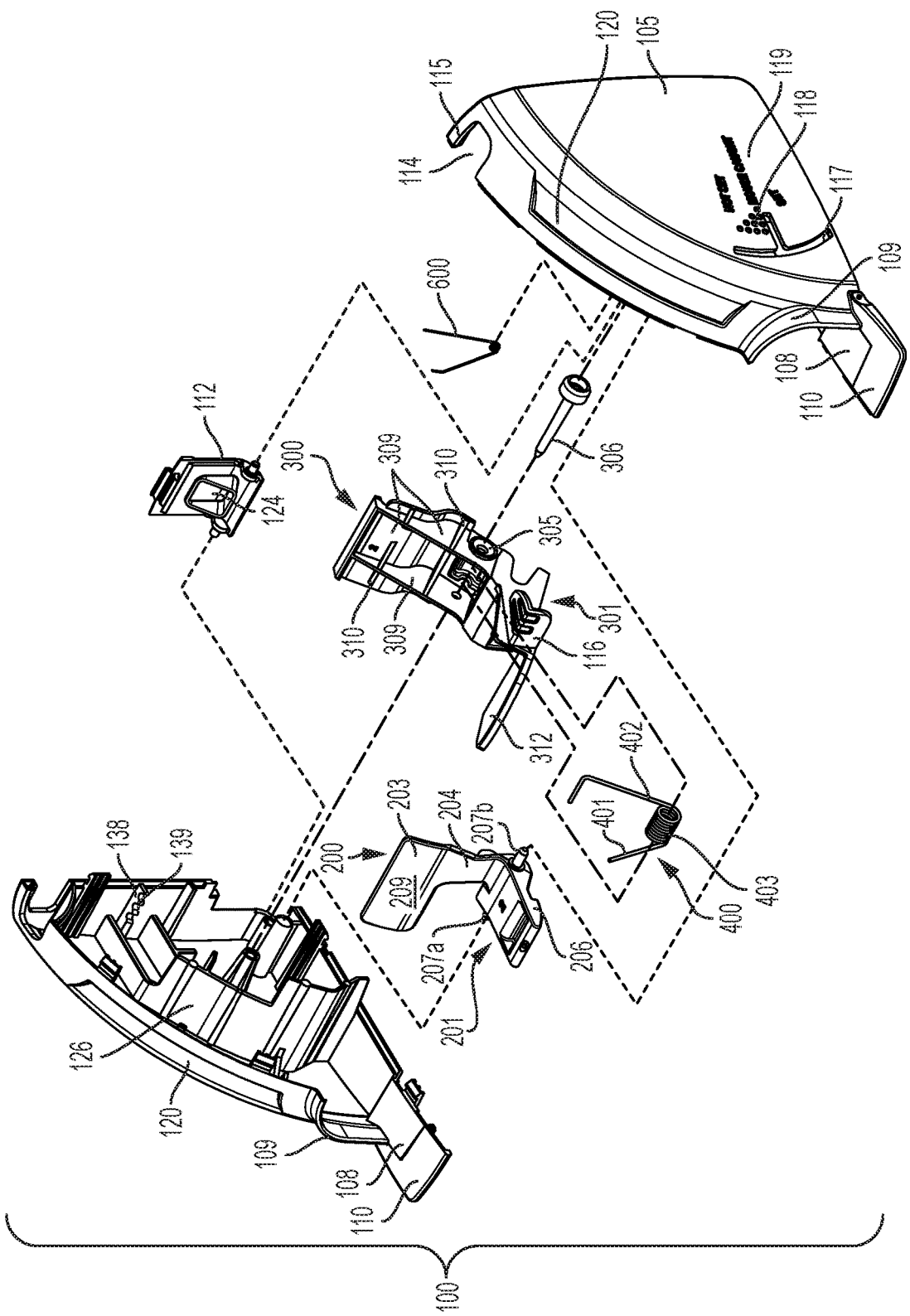
FIG. 19 depicts an exploded view of a trap with a pivoting structure, latch mechanism, and biasing element, in an unlatched position, in accordance with an exemplary embodiment.
Figure 20:
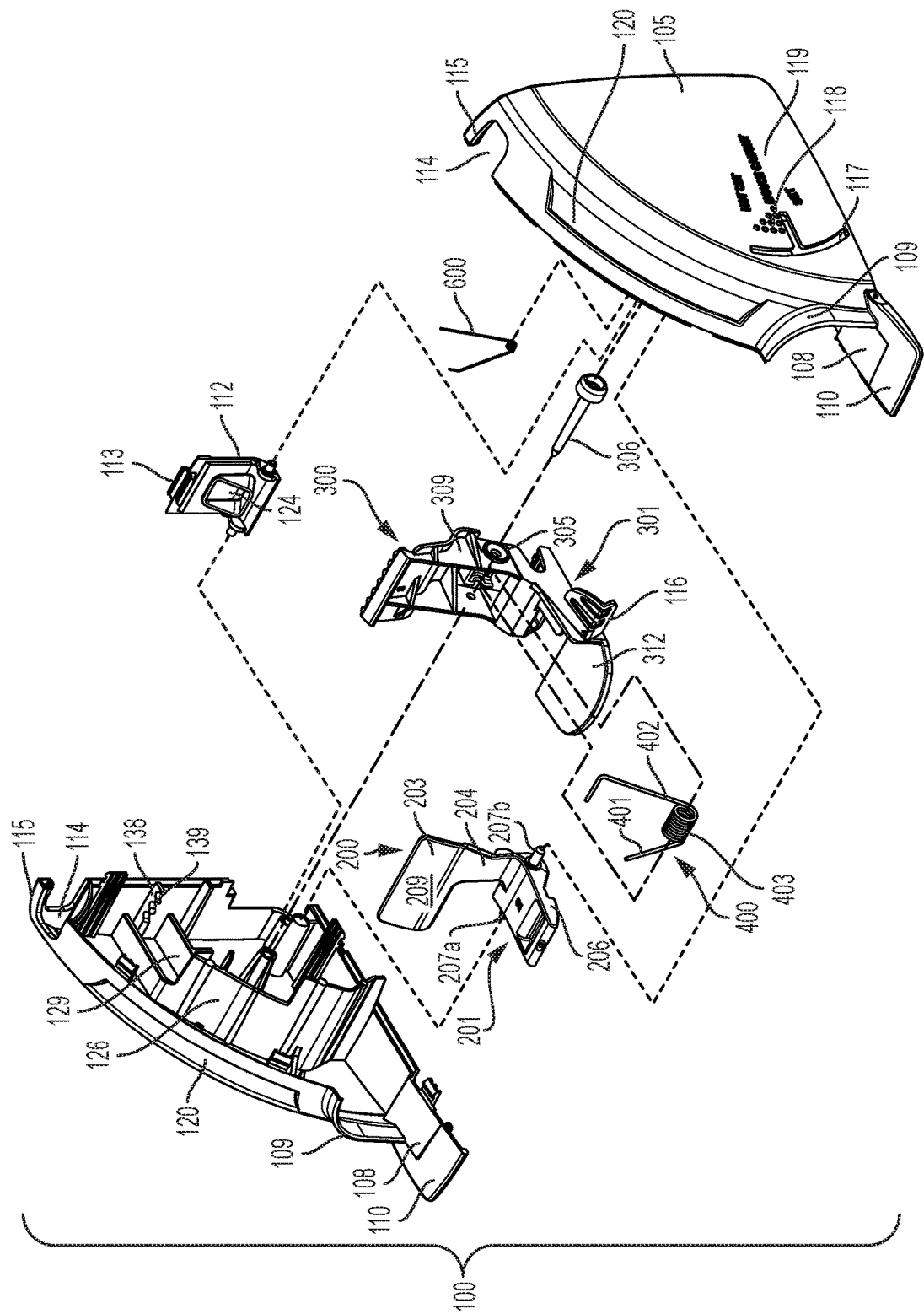
FIG. 20 depicts an exploded view of a trap with a pivoting structure, latch mechanism, and biasing element, in a set position, in accordance with an exemplary embodiment.

Referring to FIGS. 15 and 16A, perspective views of the trap having a first biasing element in accordance with an exemplary embodiment are illustrated. The first biasing element 400 may bias the pivoting structure 300 towards the back wall 106 of the housing 101 and towards the trigger plate of the latch mechanism. As shown, the first biasing element 400 may be a torsion spring. Specifically, as depicted in FIGS. 19 and 20, the torsion spring 400 may have a biased end 401 and a leveraged end 402, and a coil 403. The biased end 401 may be positioned between the pivoting structure 300 and the base 103 of the housing 101, for example, normally biasing the pivoting structure 300 in a counter-clockwise direction about second axis B as indicated by Arrow C in FIGS. 13 and 14A. The coil 403 may form an opening such that the coil may receive the rod 306, and couple the torsion spring 400 to the housing 101. The pivoting structure 300 may include one or more slots (not shown) to allow the coil 403 to reside in a position to receive the rod 306. The leveraged end 402 may be positioned within the housing 101 and may leverage the spring 400 against the vertical component of the pivoting structure. It is appreciated that a single segmented torsion spring having a single biased end, a single coil, and a single leveraged end may be used as well as other biasing elements which may bias the platform 300 towards the back wall 106 of the housing 101.

Referring to FIG. 24B, a perspective view of the pivoting structure and a trigger in accordance with an exemplary embodiment is illustrated. The pivoting structure 300 may include a set arm 116 to assist in moving the pivoting structure. The set arm 116 may extend from the pivoting structure 300, e.g., from a side of the horizontal extension piece 301 of the pivoting structure. The set arm may be used to move the pivoting structure 300 from a triggered position, e.g., when the pivoting structure is biased towards the rear wall 106, to a latched or set position, e.g., when prong 206 is engaged with latch surface 313, against the normal bias force of the first biasing element 400. In the latched or set position, the horizontal extension piece 301 of the pivoting structure 300 is positioned on top of the base 103 of the housing 101 (adjacent to the entrance 107). The housing 101 may include one or more slots 117 or cutouts from which a set arm 116 may extend from the interior of the housing to the exterior of the housing. The slot may be a curved slot, so that the tab may follow a curved path as the trap moves from a set position to a triggered position. It is appreciated that multiple set arms and multiple slots may be used or other setting structures may be used to move the pivoting structure from the triggered position to the latched position. For example, the pivoting structure may have set arms that extend from two sides of the pivoting structure. In another example, a push bar (not shown) may have one end extend from the back wall 106 (via an aperture) with the other end coupled to the pivoting structure. By pushing on the push bar, the pivoting structure may be moved from a triggered position to a latched position. In yet another example, a handle or lever (not shown) may have one end extend from the housing 101 (via an aperture) with the other end is coupled to the pivoting structure 300. By moving the handle or lever from a first position to a second position, the pivoting structure 300 may be moved from a triggered position to a latched position.

Figure 25:
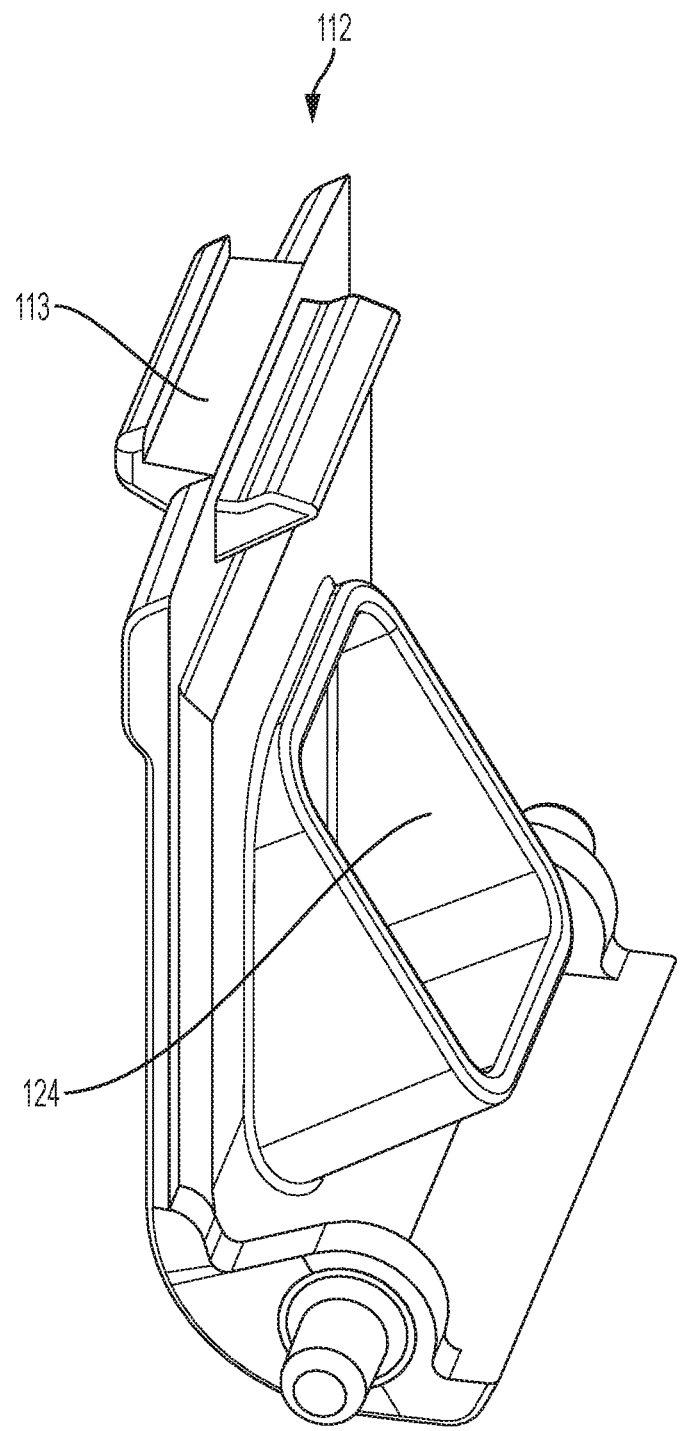
FIG. 25 depicts an exemplary view of a bait trap door in accordance with an exemplary embodiment.

The housing 101 may include an opening and a bait door 112 with an attractant reservoir 124 configured to hold an attractant (not shown). The attractant may be a scent, a rodenticide, and/or bait. The bait door may be connected to the trap housing by a hinge so that it may pivot open and closed. The bait door may also be attached to the trap housing by two pieces extending from the bottom of the bait door that extend into two indentations on the housing. The bait door may have a lever at the top that may be pushed to allow the bait door to open. The inside of the bait door may have a détente or protrusion that helps the bait door latch into a closed position. The attractant reservoir on the bait door is to allow an attractant to be placed in the attractant reservoir 124. For example, the opening may allow a knife having food, e.g., peanut butter or cheese, to be placed in the attractant reservoir 124 to assist in attracting a rodent, such as a mouse, to the trap 100. More specifically, the attractant may assist in attracting a rodent into the trap and towards the trigger plate 203. FIG. 19 illustrates the attractant reservoir 124 on the inside of the bait trap door. FIG. 25 illustrates an exemplary embodiment of a bait door 112 with attractant reservoir 124 and détente or lever 113.

FIGS. 19 and 20 are exploded views of the trap according to an exemplary embodiment, where FIG. 19 illustrates the trap in the unlatched position and FIG. 20 illustrates the trap in the set position.

As shown in FIG. 2, the first side wall of the trap may have a smooth exterior surface 125. In various embodiments, the first side wall may have additional texture added to it.

As shown in FIGS. 16B and 18B, the interior surface of the first side wall may have various protrusions extending from the interior surface towards the center of the trap. There may be a first protrusion, which is a first interior wall 126, having a width approximately equal to the width of the trap, with a height extending from the bottom surface of the trap to approximately the top surface of the pivoting structure. The height may be greater or less than the height of the pivoting structure in various embodiments. The first interior wall 126 may have a smooth top surface and a smooth bottom surface, or may have textured top and bottom surfaces in various embodiments. For example, the top surface may have ribs on it. The top surface, combined with the side walls and the roof of the trap, create a tunnel space for the rodent to enter deeper into the trap, in a direction from the entrance toward the rear wall.

There may be a second protrusion 127 and a third protrusion 128, which have a width and a depth. These protrusions 127, 128 may extend in a horizontal plane. There may be additional protrusions such as a vertical protrusion 129 to provide support to the horizontal protrusions 127, 128.

Figure 17:
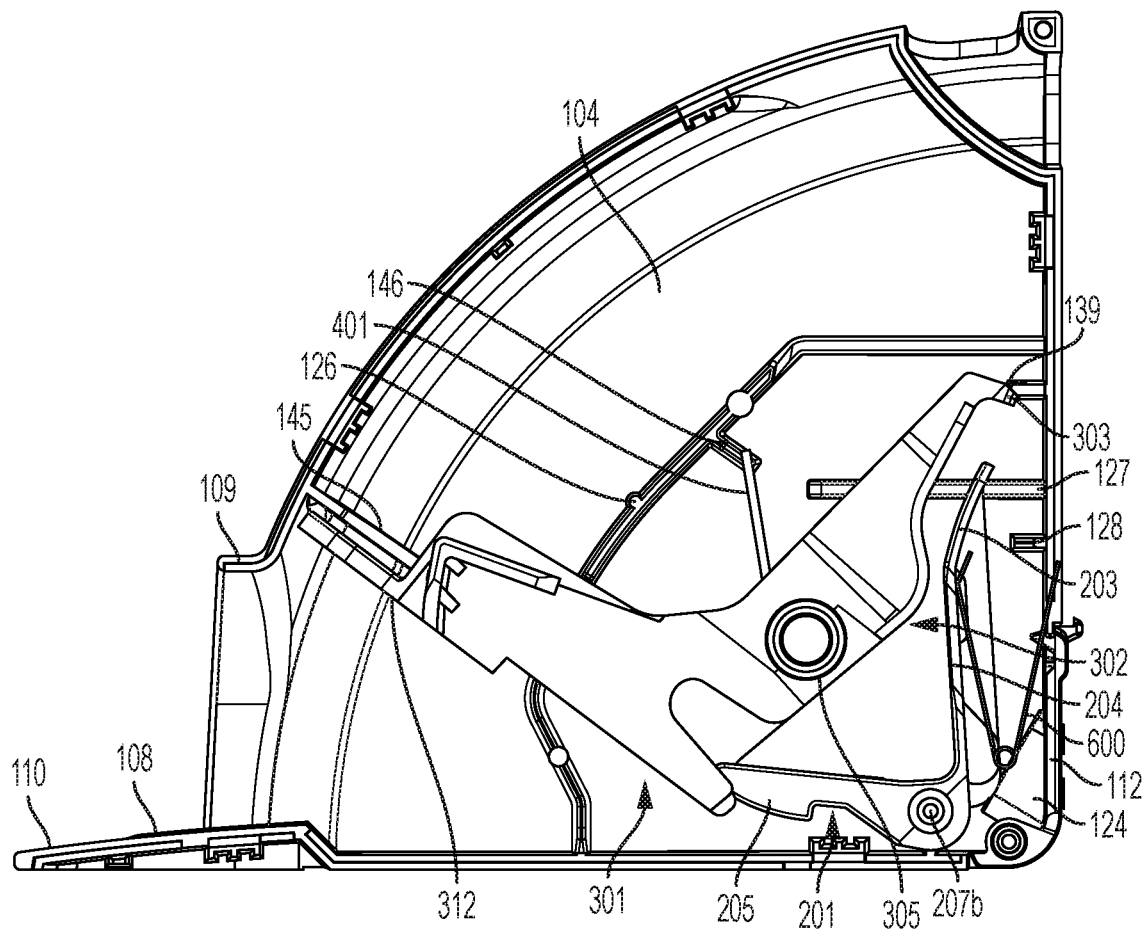
FIG. 17 depicts a side view of a trap, without a side wall, in an unlatched position, in accordance with an exemplary embodiment.

There may be a fourth protrusion that follows the curvature of the first side wall and continues along the roof of the trap. This fourth protrusion may be located in closer proximity to the entrance of the trap. This protrusion 145 having a width and an interior edge, where a portion of the width near the interior edge may overlap with the paddle 312 of the horizontal extension piece 301 of the pivoting structure when the trap is in the triggered or unlatched positions (FIGS. 17, 18A).

There may be additional protrusions in locations corresponding to the first and second extensions 207a and 207b and/or rod 306, respectively.

As shown in FIG. 6A, the second side wall 105 may have the slot 117 for the set arm 116 of the trap, and the indicia 118, 119 to indicate what position the trap is in.

As shown in FIG. 14B the interior of the second side wall may also have protrusions. The second side wall may have a first protrusion, which is a second interior wall 132, having a depth and a width. The second interior wall 132 may be positioned at an angle in relation to the bottom surface of the trap. In various embodiments, the second interior wall may also be curved. The second interior wall may be similar to the first interior wall 126, and indeed they may even be in contact with each other. Together, the first and second interior walls create a ramp on which the rodent may crawl up and across to reach farther into the interior of the trap. Thus the first and second side walls, in combination with the first and second interior walls and the roof, create the tunnel for the rodent to access the bait. There may also be additional protrusions, aligned with the protrusions on the first wall that correspond to the first and second axes A and B. There may also be additional protrusions 135, 136, and 137 to help support the structure of the second side wall.

The back wall of the trap also has at least one protrusion 138. This protrusion 138 may extend horizontally across the rear wall and have a serrated edge 139 facing the interior of the trap. This serrated edge aligns with the serrated edge on the top of the vertical extension piece of the pivoting structure (described below), such that they may interlock with each other when the trap is in the unlatched position. The serrated edges may also be interdigitating sinusoidal teeth, such as that disclosed in U.S. Pat. No. 6,415,544, the contents of which are incorporated by reference. The curved nature of the teeth prevents the drawing of blood from the rodent. It also allows a greater pounds per square inch of pressure to be applied to the grabbing load as when compared to the grabbing load of a flat surface. This increases the hold on the mouse, to that it cannot back out of the trap.

Figure 21:
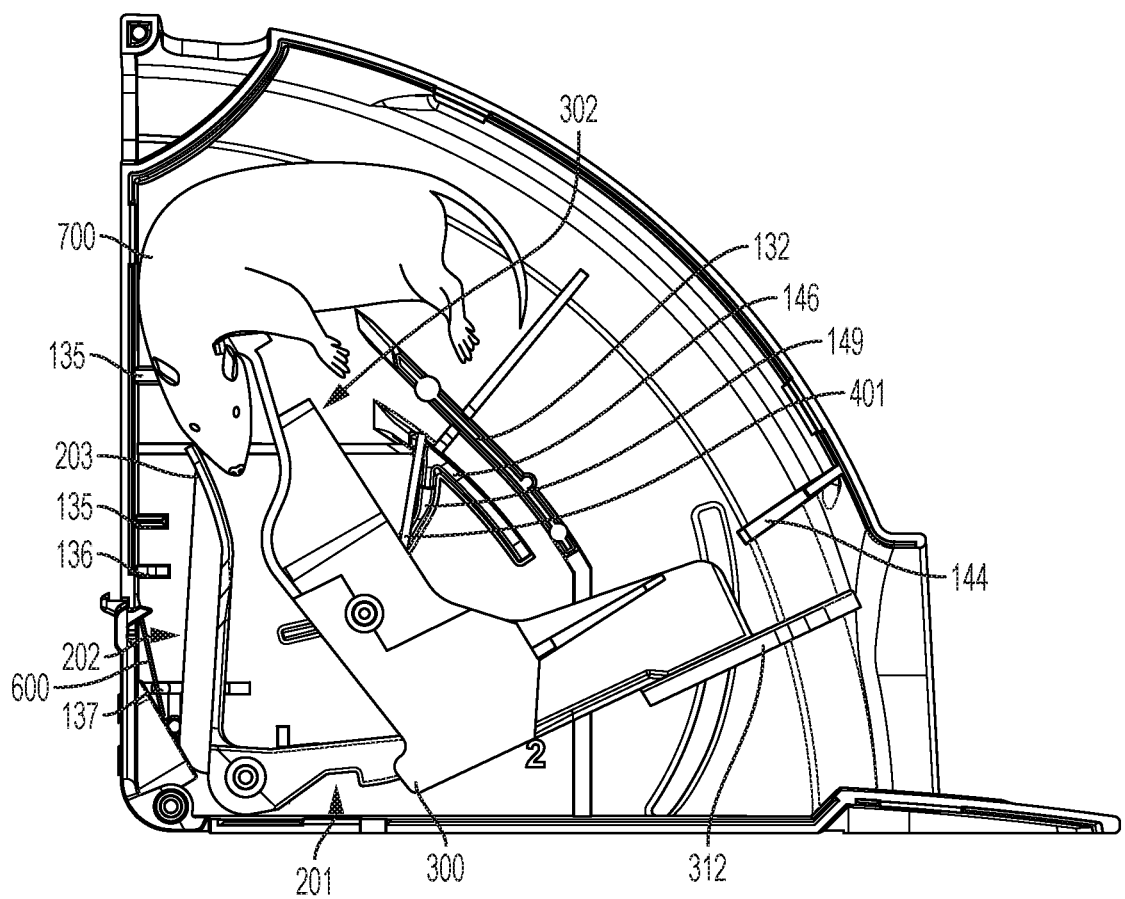
FIG. 21 depicts a side view of a rodent trap where the trap has been triggered by a rodent in accordance with an exemplary embodiment.

There may be an additional protrusion on each of the side walls. These protrusions, in an exemplary embodiment, are located protruding from the interior of the roof of the trap, where one is associated with each of the side walls. Protrusion 144 extends from the portion of the roof associated with second side wall, as illustrated in FIGS. 14A, 14B, and 21. Protrusion 145 extends from the portion of the roof associated with the first side wall, as illustrated in FIGS. 18A and 18B. Protrusions 144 and 145 may join together to create a location, which may be a flat surface, for paddle 312 to contact or be positioned adjacent to when the trap is in the triggered and unlatched positions, such that a captured rodent would not be visible to the user of the device while the user disposes of the device.

FIG. 19 illustrates the trigger structure 200. The trigger structure has a width, a depth and a height. The width may be less than or equal to the distance between the first side wall 104 and the second side wall 105. The width may be less than or equal to a width of the pivoting structure 300. The depth may be the distance from the edge of the horizontal component 201 closest to the entrance of the trap to approximately the farthest back surface of the trigger structure facing the rear wall 106 of the trap. The height may be the distance from the bottom of the horizontal component 201 to the top of the trigger plate 203.

As described above, the top portion of the trigger structure may be the trigger plate 203. The trigger plate has a width and a height. The trigger plate may have a curvature to it. The trigger plate 203 may be of a greater width than the vertical arm 204. The vertical arm 204 may be positioned between the latch mechanism 205 and the trigger plate 203, and provides additional height to the trigger structure. As discussed, the first axis A may be located approximately where the vertical arm 204 and the latch mechanism 205 meet, e.g., where the first and second extensions 207a and 207b are disposed. In other embodiments, the first axis A (and thus, for example, the first and second extensions 207a and 207b) may be located near the rear portion of the latch mechanism 205. The latch mechanism 205 may be a horizontal component of the trigger structure 200, of which at least a portion of, or a component protruding from, engages with the pivoting structure 300 when the trap is in a set position.

The bottom portion of the latch mechanism may have a prong 206 as indicated in FIG. 19. The prong 206 protrudes from the bottom of the trigger structure a sufficient amount to connect with and latch with latch surface 313 of the pivoting structure 300, to hold the trap in a set configuration.

The trigger plate 203 has a surface area that may be rectangular in shape. The surface area may be the vertical surface area 209, which may be at least partially entrance-facing when the trigger structure is installed within the housing. In some embodiments, when the trap is assembled and in the set position, the vertical surface area 209 of the trigger plate (FIG. 14A) is positioned such that it faces in a generally vertical direction towards the roof and towards the front of the trap.

Figure 26A:
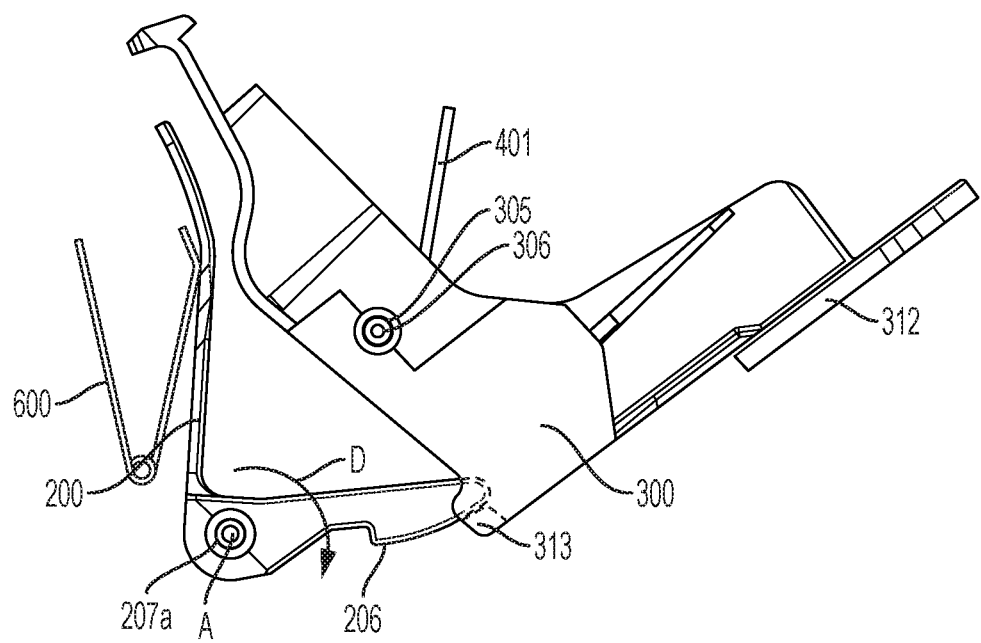
FIGS. 26A and 26B depict a side view of a trigger assembly and its engagement with a pivoting structure in accordance with an exemplary embodiment.
Figure 26B:
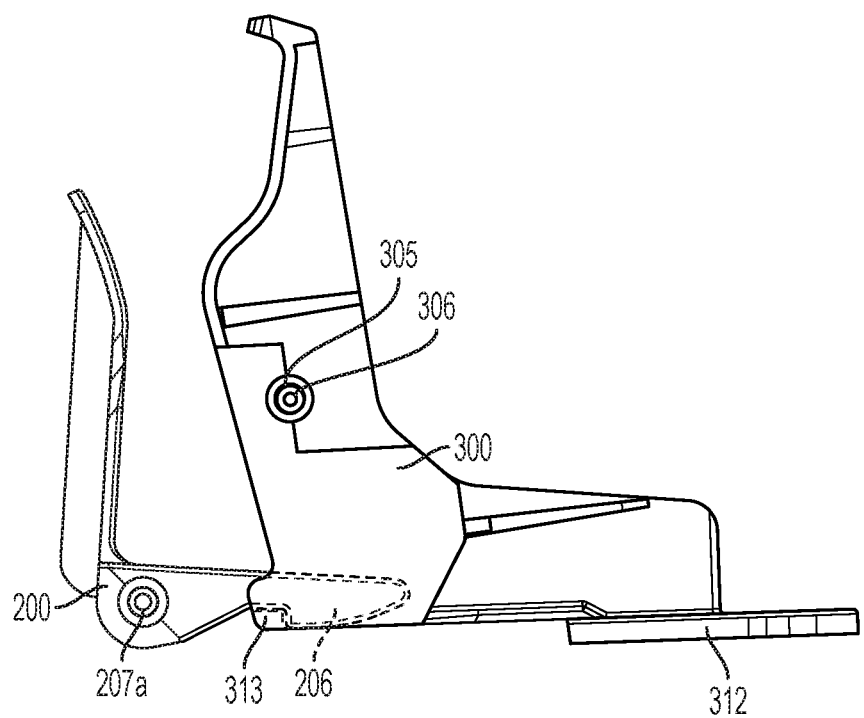

There is also a second biasing element which is a second biasing element 600 (e.g., a spring) in an exemplary embodiment of a rodent trap. As illustrated in FIG. 26A, second biasing element 600 is positioned between the trigger structure 200 and the rear wall of the trap. The forward arm of the second spring applies a force to the trigger structure to hold it in a position such that the vertical portion of the trigger structure remains away from the rear wall and that the latch mechanism of the trigger structure may remain in a horizontal position, such that prong 206 remains engaged with latch surface 313 of the pivoting structure. In other words, the second biasing element 600 may bias the latch mechanism 205 toward the latch surface 313 of the pivoting structure (e.g., bias in a clockwise direction as identified by Arrow D about first axis A shown in FIG. 26A). FIG. 26B illustrates the trigger structure 200 and pivoting structure 300 when the trap is in the set position. The prong 206 is engaged with the pivoting structure, for example, engaged with the latch surface 313. The spring provides a force for at least two purposes. One purpose of the spring is to make the trap easier to put into the set configuration. The spring provides sufficient force so that the trigger structure will still be in a forward enough position so that prong 206 engages with latch surface 313 regardless of the angle at which the user is holding the trap. This prevents the weight of the trigger plate rotating the trigger structure in the wrong direction, for example, if the user is holding the trap at an angle such that the entrance is at a higher orientation than the bait door. This allows the trap to be set more reliably without having to place the base of the trap on a flat surface in order to set it. Because of the second spring, the trap will not trigger accidentally when you move it or place it in another orientation. Thus, the trap may be held in any orientation, such as sideways or upside-down, when in the set position, and the second spring will also prevent it from an accidental trigger.

A second purpose of the second spring is to provide sufficient force so that a rodent has to enter far enough into the trap to apply enough weight to push on surface 209 of the trigger structure so that its neck and back are aligned with the serrated edges 139 when the trap is triggered (see FIG. 17). This allows the serrated edges (139 and 303) to grab and apply a force to the rodent in the proper location so that the rodent dies quickly by suffocation, which can be a more humane cause of death than if the rodent were to be compressed at another location, taking longer to kill the rodent (see FIG. 21).

When a rodent pushes on the vertical surface 209, it is pushed toward the back wall of the housing, for example, causing the trigger structure 200 to rotate against the spring force of spring 600 in a counter-clockwise direction (opposite the direction indicated by Arrow D). This disengages the trap, e.g., lifts the prong 206 up and away from the latch surface 313, springing the pivoting structure 300 and thus allowing the first biasing element 400 to rotate the pivoting structure counter-clockwise about the second axis B in the direction indicated by Arrow C in FIGS. 13 and 14A. When the pivoting structure 300 pivots or rotates as such, it causes the paddle 312 to move to a position adjacent to or engaged with protrusions 144 and 145 and the serrated edge 303 to move toward the rear wall. When the paddle 312 moves to the position adjacent to or engaged with protrusions 144 and 145, the paddle closes the trap so that the rodent cannot escape out through the entrance. The serrated edge 303 moving toward the other serrated edge 139 traps the rodent by compressing against the rodent and applying a grabbing force provided by the first torsion spring, trapping the rodent in place. The curved nature of the pivoting structure assists the rodent in using its head to push. The exact shape and spacing of an exemplary embodiment of a rodent trap prevents the mouse from moving too far into the trap and reaching the bait. This allows the rodent to be captured in the chest region, so it can suffocate quickly and die more humanely. The rodent enters the trap and crawls far enough in towards the attractant in the attractant reservoir so that its head places weight on vertical surface area 209 of the trigger structure, pushing vertical surface 209 towards the rear wall of the trap, as discussed above.

Pivoting structure 300 may be a generally L-shaped piece of the trap. The pivoting structure has a horizontal extension piece 301 and a vertical extension piece 302 as described above. The pivoting structure 300 has a width, a depth and a height. The width is less than or equal to the distance between the first side wall 104 and the second side wall 105. The depth is the distance from the edge of the horizontal extension piece closest to the entrance of the trap to approximately the back surface of the vertical extension piece facing the rear wall 106 of the trap. The height is the distance from the bottom of the horizontal extension piece to the top of the vertical extension piece.

The vertical extension piece 302 of the pivoting structure may have a curvature to it. The rearward face 304 of the vertical extension piece may have a smooth surface, having a width and a height. The smooth surface may be curved as shown in FIGS. 13 and 14. The front face 308 of the vertical extension piece may be a smooth surface with a height and a width that matches the height and width of the back surface. The front surface may have a curvature to it that matches the curvature of the back surface. As shown in FIG. 19, the front surface of the vertical extension piece may have one or more vertical support walls 309 extending from the surface, in a direction towards the entrance 107 of the trap. The vertical support walls 309 may be aligned vertically with the vertical extension piece 302. There may be additional walls extending from the front surface of the vertical extension piece towards the entrance of the trap. These additional walls are horizontal support walls 310. The front surface of the vertical extension piece contains an indentation or other molding of a size and shape to accommodate a biasing element and a rod. In some embodiments, the vertical support walls 309 include the channel 305 to allow the rod 306 or other pivot enabling elements to pass through. In some embodiments, the vertical support walls 309 may include holes or other apertures to receive the rod or other pivot enabling elements. In various embodiments, the vertical support walls may have protrusions on them to allow the pivoting structure to contact the side walls of the trap so that it may be positioned in place within the trap.

The horizontal extension piece 301 may extend horizontally in a direction away from the vertical extension piece 302. It may be positioned below the channel 305 or second axis B. The horizontal extension piece 301 may have a width and a depth. It may have a smooth top surface and a smooth bottom surface. The top and bottom surfaces may have a texture in various embodiments. In the set configuration of the trap, the horizontal extension piece may have its surface area flush with the entrance ramp of the trap, such that an opening and path is created for the rodent to enter the trap. In the triggered and unlatched positions, the horizontal surface area is of a size great enough to inhibit a user from viewing the interior of the trap when looking into the entrance.

Referring to FIGS. 12 and 14, when the trap is in the set position, the pivoting structure 300 is positioned in a location above the trigger structure 200. When in the set position, the prong 206 of the trigger structure is engaged with the latch surface 313, thus holding the pivoting structure in the set position against the normal bias force of the first biasing element 400 until triggered.

The trap 100 provides a mechanism for setting the trap. The first biasing element 400 is located adjacent to the pivoting structure, positioned on the side of the pivoting structure facing the entrance of the trap. Rod 306 may run through the coil of the spring, at the channel 305 or second axis B. When in the unlatched position, the biased end 401 of the spring may be located against a protrusion 146 extending from the roof of the housing. The protrusions on each side of the housing may connect when the housing is connected together as one unit, to create a continuous surface for the spring end 401 to be positioned against. FIG. 17 illustrates this position of the spring.

When the trap is in the set position, as illustrated in FIG. 18A, the spring is tensioned against the same components of the trap as when it is in the unlatched position, but the angle between the leveraged end 402 and biased end 401 of the spring is smaller, such that there is a biasing tension in the spring.

In the unlatched position, the rear-facing surface 304 of the pivoting structure and the entrance-facing vertical surface area 209 of the trigger plate are drawn towards each other at least by the bias of the spring. Similarly, the serrated edges of each of the rear wall protrusion and the pivoting structure are drawn closer to each other. The horizontal component of the pivoting structure is pivoted upwards around the second axis B so that it moves from being flush with the platform 110 on the base 103 in the set position to blocking the entrance in a raised position in the unlatched position as described above.

In the triggered position, illustrated in FIG. 21, in which a side view of an exemplary embodiment is illustrated, a rodent 700 is trapped between the vertical extension piece of the pivoting structure 302 and at least the rear wall 106. According to exemplary embodiments, the rodent may be trapped between serrated edge of the pivoting structure and the serrated edge of a protrusion on the rear wall. In various embodiments, the rodent may be trapped between the trigger plate and the pivoting structure, depending on the rodent's size and reaction to the triggering of the trap.

Figure 22:
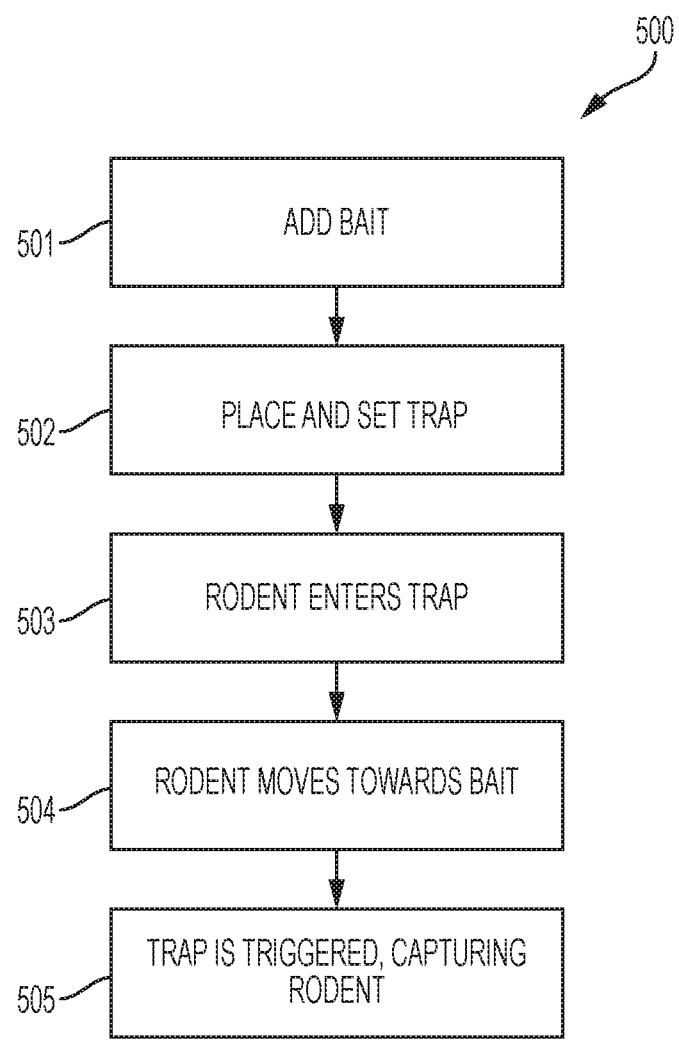
FIG. 22 depicts a method flow chart of the use of the trap, in accordance with an exemplary embodiment.

FIG. 22 depicts a flow chart of a method 500 of using the trap 100. This method is exemplary as there are a variety of ways to carry out the present disclosure. Each block shown in the method represents one or more processes or decisions carried out in the exemplary method, and these processes or decisions are not necessarily carried out in the specific order outlined in the method, nor may be each required.

In step one 501, the bait door is opened and a rodent attractant, or bait, may be placed into the attractant reservoir 124, then the bait trap door may be closed. In various embodiments, this step may be skipped because the trap may be pre-loaded with bait or a rodent attractant.

In step two 502, the trap is placed and the trap is set by pushing down on the set arm 116 extending from the second side wall 105 of the trap. The set arm is pressed until the user can sense that the latch mechanism is latched or set into place. The indicia on the second side wall may indicate when the trap is set. Placing and setting the trap may be performed in either order according to various embodiments.

In the third step 503, a rodent enters the trap. The rodent may be a mouse according to exemplary embodiments. The trap is designed to guide the rodent up the pathway defined by the interior protrusions, the side walls, and the roof.

In the fourth step 504, the rodent may travel down along the back wall of the trap towards the bait cup. In doing so, the rodent will be positioning itself between the serrated edge of the protrusion of the rear wall and the serrated edge of the pivoting structure.

In the fifth step 505, the rodent contacts the trigger plate as it moves toward the bait cup. The rodent may contact the trigger plate with its head or any other body part. Once the contact is made, the latch mechanism shifts to disengage so that the springs are released and the trap is triggered. The trigger mechanism is not dependent on the weight of the rodent or the weight placed on it by the rodent, due to the force provided by the second spring. In some embodiments, it is desirable that at this point in time, the rodent's entire body is inside the trap. In this triggered position, the serrated edges may close together with the rodent in between them, to asphyxiate the rodent. In the event the rodent is of a size large enough where the serrated edges do not hold the rodent in place or do not asphyxiate the rodent, the horizontal extension piece 301 of the pivoting structure 300 will now be blocking the entrance, preventing the rodent from escaping. The pivoting structure is not required to form a seal with the protrusions which it rests against in the triggered position. In an exemplary embodiment, the pivoting structure and the protrusions have a gap between them of sufficient size to allow a rodent to pull its tail further into the trap, so that no part of the trapped rodent will be visible to the user once the trap has been triggered and the rodent has been caught.

In various exemplary embodiments, the traps may be configured for a single use. Accordingly, the trap and its members or components may be made of a relatively inexpensive material, such as a thin-walled rigid polymeric material that may be injection molded into the desired shapes. For example, the housing 101 may be made of a polymeric material, such as rigid styrene polymers and co-polymers. Other suitable materials include acrylonitrile-butadiene-styrene (ABS), or polyvinyl-chloride (PVC). It is appreciated that other suitable polymeric materials, and/or suitable non-polymeric materials, may be selected for the construction of the trap or its component parts.

In certain exemplary embodiments, each of the component described herein are injection molded to a desired shape. In some exemplary embodiments, each component may be molded as a single, unitary molded part. In other exemplary embodiments, the component may be molded in multiple parts that are joined or attached together to form the component. The various methods for designing molds and joining various parts to form one component will be understood by one familiar with such processes and parts.

Accordingly, the various embodiments are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments may be beneficially implemented in any number of environments for any number of purposes. Accordingly, the claims set forth below should be construed in view of the full breadth and spirit of the embodiments as disclosed herein. While the foregoing description includes many details and specificities, it is to be understood that these have been included for purposes of explanation only, and are not to be interpreted as limitations of the various embodiments. Many modifications to the embodiments described above may be made without departing from the spirit and scope of this description.

The invention claimed is:

1. A trap, comprising:
   a housing having an entrance, a rear wall, a first side wall, a second side wall, a roof, and a base extending between the rear wall, the first side wall, and the second side wall;
   the entrance being located opposite the rear wall;
   the roof extending between the rear wall, the first side wall, and the second side wall;
   a trigger structure pivotally coupled to the first and second side walls at a first location adjacent the base;
   a pivoting structure pivotally coupled to the first and second side walls at a second location and adapted to releasably engage with the trigger structure, wherein the pivoting structure is biased towards the rear wall and the second location is located above the first location; and
   a trigger plate located at an upper portion of the trigger structure such that, when triggered by a rodent, the trigger plate causing a latch mechanism on the trigger structure to disengage the pivoting structure, allowing the pivoting structure to pivot towards the rear wall thereby moving the rodent towards the rear wall and trapping the rodent between at least the pivoting structure and the rear wall of the housing.

2. The trap of claim 1, wherein the pivoting structure is biased towards the rear wall by a first biasing element coupled to the pivoting structure.

3. The trap of claim 2, wherein the first biasing element is a first torsion spring.

4. The trap of claim 2 further comprising a second biasing element coupled to the trigger structure and biasing the trigger structure towards the pivoting structure to hold the trap in a set position for any positionable orientation of the trap.

5. The trap of claim 4, wherein the second biasing element is a second torsion spring.

6. The trap of claim 1, wherein the latch mechanism further comprises a prong.

7. The trap of claim 1, further comprising:
a set arm coupled to the pivoting structure and extending outside the housing through a slot in the second side wall, the set arm being moveable to a set position in which the pivoting structure is engaged with the latch mechanism such that the trap is set.

8. The trap of claim 7, wherein the pivoting structure which is biased towards the rear wall into a triggered position is allowed to move to the triggered position in response to a force applied to the trigger structure causing the latch mechanism on the trigger structure to disengage from the pivoting structure.

9. The trap of claim 7, wherein the set arm moves from the set position to a triggered position when the trap is triggered in response to movement of the pivoting structure, where the triggered position is a plurality of positions where each position varies based on a size of the rodent that triggered the trap.

10. The trap of claim 1, further comprising:
a bait access door and an attractant reservoir, located in the rear wall.

11. The trap of claim 1, further comprising:
a serrated projection mounted on the rear wall upwards of the trigger plate, and projecting inwardly therefrom.

12. The trap of claim 1, wherein a portion of the pivoting structure designed to contact the rodent upon actuation of the trap comprises a serrated edge.

13. The trap of claim 1, further comprising:
a first interior wall attached to the first side wall and the base, extending inwardly from the first side wall and extending upwardly from the base over a portion of the first side wall; and
a second interior wall attached to the second side wall, extending interiorly from the second side wall such that the second interior wall is adjacent a portion of the first interior wall.

14. The trap of claim 13, further comprising:
the first and second interior walls, along with a paddle of the pivoting structure, forming a barrier preventing exit of the rodent when the trap is triggered.

15. The trap of claim 13, further comprising:
a paddle of the pivoting structure being located adjacent the base, inside of the entrance, forward of where the first interior wall is attached to the base, when the trap is in a set position.

16. The trap of claim 15, wherein the paddle rotates upwards and inwards in response to triggering of the trap.

17. The trap of claim 1, further comprising:
a lower portion of the latch mechanism engaging with a lower portion of the pivoting structure, adjacent the base, at an indentation in the lower portion of the pivoting structure.

18. The trap of claim 1, wherein the roof further extends between the rear wall, the first side wall, the second side wall, and the entrance.

19. A trap, comprising:
a housing having an entrance, a rear wall, a first side wall, a second side wall, a roof, and a base extending between the rear wall, the first side wall, and the second side wall;
the entrance being located opposite the rear wall;
the roof extending between the rear wall, the first side wall, and the second side wall, the roof comprising a protrusion extending toward the base;
a trigger structure pivotally coupled to the first and second side walls at a first location adjacent the base;
a pivoting structure pivotally coupled to the first and second side walls at a second location and adapted to releasably engage with the trigger structure, the pivoting structure comprising a paddle and a vertical extension piece, wherein the vertical extension piece includes a distal end, wherein the pivoting structure is biased towards the rear wall; and
a trigger plate located at an upper portion of the trigger structure such that, when triggered, the trigger plate causing a latch mechanism on the trigger structure to disengage the pivoting structure, allowing the pivoting structure to pivot to a triggered position such that the distal end of the vertical extension piece moves to a position adjacent the rear wall and the paddle moves to a position such that the paddle engages the protrusion of the roof, enclosing an interior portion of the trap.

* * * * *